US006892193B2

(12) United States Patent
Bolle et al.

(10) Patent No.: US 6,892,193 B2
(45) Date of Patent: May 10, 2005

(54) METHOD AND APPARATUS FOR INDUCING CLASSIFIERS FOR MULTIMEDIA BASED ON UNIFIED REPRESENTATION OF FEATURES REFLECTING DISPARATE MODALITIES

(75) Inventors: Rudolf M. Bolle, Bedford Hills, NY (US); Norman Haas, Mount Kisco, NY (US); Frank J. Oles, Peekskill, NY (US); Tong Zhang, Tuckahoe, NY (US)

(73) Assignee: International Business Machines Corporation, Armonk, NY (US)

( * ) Notice: Subject to any disclaimer, the term of this patent is extended or adjusted under 35 U.S.C. 154(b) by 663 days.

(21) Appl. No.: 09/853,191

(22) Filed: May 10, 2001

(65) Prior Publication Data

US 2003/0033347 A1 Feb. 13, 2003

(51) Int. Cl.⁷ .............................. G06F 7/00; G06F 15/00
(52) U.S. Cl. ........................................................ 706/20
(58) Field of Search ............................................. 706/20

(56) References Cited

U.S. PATENT DOCUMENTS

| | | | |
|---|---|---|---|
| 5,151,788 A | | 9/1992 | Blum |
| 5,343,251 A | | 8/1994 | Nafeh |
| 5,428,733 A | * | 6/1995 | Carr ............................ 715/809 |
| 5,434,965 A | * | 7/1995 | Matheny et al. ............ 715/710 |
| 5,696,866 A | | 12/1997 | Iggulden et al. |
| 5,708,477 A | | 1/1998 | Forbes et al. |
| 5,794,178 A | * | 8/1998 | Caid et al. ....................... 704/9 |
| 5,924,077 A | * | 7/1999 | Beach et al. ................... 705/10 |
| 5,983,237 A | * | 11/1999 | Jain et al. ................. 707/104.1 |
| 6,055,043 A | * | 4/2000 | Chambers ................... 356/73.1 |
| 6,055,548 A | * | 4/2000 | Comer et al. ................ 715/503 |
| 6,138,130 A | * | 10/2000 | Adler et al. ................. 715/503 |
| 6,173,275 B1 | * | 1/2001 | Caid et al. ..................... 706/14 |
| 6,363,380 B1 | * | 3/2002 | Dimitrova ....................... 707/6 |
| 6,611,842 B1 | * | 8/2003 | Brown ........................ 707/102 |
| 2002/0004793 A1 | | 1/2002 | Keith |
| 2002/0147782 A1 | * | 10/2002 | Dimitrova et al. ........... 709/207 |
| 2002/0161747 A1 | * | 10/2002 | Li et al. ......................... 707/3 |
| 2003/0004966 A1 | | 1/2003 | Bolle et al. |
| 2003/0028534 A1 | | 2/2003 | Crivella et al. |
| 2003/0033347 A1 | | 2/2003 | Bolle et al. |

OTHER PUBLICATIONS

Dynamic behavior analysis in compressed fingerprint videos Dorai, C.; Ratha, N.K.; Bolle, R.M.; Circuits and Systems for Video Technology, IEEE Transactions on ,vol.: 14 , Issue: 1 , Jan. 2004 pp.: 58–73.*

Biometrics:The future of identification Pankanti, S.; Bolle, R.M.; Jain, A.; Computer ,vol.: 33 , Issue: 2 , Feb. 2000 □□pp.: 46–49.*

(Continued)

Primary Examiner—Anthony Knight
Assistant Examiner—Michael B. Holmes
(74) Attorney, Agent, or Firm—Louis J. Percello, Esq.

(57) ABSTRACT

This invention is a system and method to perform categorization (classification) of multimedia items. These items are comprised of a multitude of disparate information sources, in particular, visual information and textual information. Classifiers are induced based on combining textual and visual feature vectors. Textual features are the traditional ones, such as, word count vectors. Visual features include, but are not limited to, color properties of key intervals and motion properties of key intervals. The visual feature vectors are determined in such a fashion that the vectors are sparse. The vector components are features such as the absence or presence of the color green in spatial regions and the absence or the amount of visual flow in spatial regions of the media items. The text and the visual representation vectors are combined in a systematic and coherent fashion. This vector representation of a media item lends itself to well-established learning techniques. The resulting system, subject of this invention, categorizes (or classifies) media items based both on textual features and visual features.

24 Claims, 27 Drawing Sheets

OTHER PUBLICATIONS

On geometric hashing and the generalized Hough transform Hecker, Y.C.; Bolle, R.M.; Systems, Man and Cybernetics, IEEE Transactions on ,vol.:24 , Issue: 9 , Sep. 1994 pp.: 1328–1338.*

The multiple window parameter transform Califano, A.; Bolle, R.M.; Pattern Analysis and Machine Intelligence, IEEE Transactions on ,vol.: 14 ,Issue: 12 , Dec. 1992 pp.: 1157–1170.*

Yao Wang, Zhu Liu, and Jin–Cheng Huang, "Multimedia Content Analysis" Using Both Audio and Video Vlues, IEEE Signal Processing Magazine, Nov. 2000, pps. 12–36.*

A complete and extendable approach to visual recognition Bolle, R.M.; Califano, A.; Kjeldsen, R.; Pattern Analysis and Machine Intelligence, IEEE Transactions on ,vol.: 14 , Issue: 5 , May 1992 pp.: 534–548.*

VeggieVision: a produce recognition system Bolle, R.M.; Connell, J.H.; Haas, N.; Mohan, R.; Taubin, G.; Applications of Computer Vision, 1996. WACV '96., Proceedings 3rd IEEE Workshop on , Dec. 2–4 1996 pp.: 244–251.*

Is there any texture in the image? Karu, K.; Jain, A.K.; Bolle, R.M.; Pattern Recognition, 1996., Proceedings of the 13th International Conference on ,vol.: 2 , Aug. 25–29 1996 pp.: 770–774 vol. 2.*

Comparison of distance measures for video copy detection Hampapur, A.; Bolle, R.M.; Multimedia and Expo, 2001. ICME 2001. IEEE International Conference on , Aug. 22–25, 2001 pp.: 737–740.*

Representing and comparing shapes using shape polynomials Taubin, G.; Bolle, R.M.; Cooper, D.B.; Computer Vision and Pattern Recognition, 1989. Proceedings CVPR '89., IEEE Computer Society Conference on , Jun. 4–8, 1989 pp.: 510–516.*

Content–based digital video retrieval Bolle, R.M.; Yeo, B.L.; Yeung, M.M.; Broadcasting Convention, 1997. International , Sep. 12–16, 1997 pp.: 160–165.*

Data and model driven foveation Califano, A.; Kjeldsen, R.; Bolle, R.M.; Pattern Recognition, 1990. Proceedings., 10th International Conference on ,vol.: i , Jun. 16–21, 1990 pp.: 1–7 vol. 1.*

Smith et al., "Video Skimming and Characterization Through the Combination of Image and Language Understanding Techniques," CMU–CS–97–11, pp. 1–11 (1997).

Local Color Detection Applied to TV Commercial Recognition, Third International Conference, Visual '99', Amsterdam, Jun. 1999, pp. 237–244, by J.M. Sanchez, X. Binega, J. Vitria and P. Radeva.

"Veggie Vision: A Produce Recognition System," in Proc. Third IEEE Workshop on Applications of Computer Vision, pp. 244–251, Dec. 1996 b R. Bolle, J. Conell, G. Taubin.

Finding Pirated Video Sequences on the Internet. tech.rep., Stanford Infolab, Feb. 1999, by P. Indyk, G. Iyengar and N. Shivakumar.

"Video Sequence Matching", International Conference on Acoustics, Speech and Signal Processing, (ICASSP), May, 1998, by R. Mohan.

Feature Based Indexing For Media Tracking. In Proc. of Int. Conf. on Multimedia and Expo, Aug. 2000, pp. 67–70 by R.M. Bolle and A. Hampapur.

"On the Detection and Recognition of Television Commercials." In Proc. of the IEEE Conf. on Multimedia Computing and Systems, 1997, by C. Lienhart, C. Kuhmunch and W. Effelsburg.

"Video Classification Based on HMM Using Text and Faces," (Dimitrova, et al).

"Video Skimming For Quick Browsing Based on Audio and Image Characterization", Carnegie Mellon University, Tech Rep. CMU–CS–95–186, Jun. 1995 (Smith, et al) by M.A. Smith and T. Kanade.

"Towards Content–Based Browsing of Broadcast News Video," in Intelligent Multimedia Info Retrieval, Issue 197, M.T. Maybury (ed.), pp. 241–258. AAAI Press/The MIT Press (Mani, et al), by I. Mani, D. House, M. Maybury, M. Green.

"Speech Transcript Analysis For Automatic Search," IBM Research Tech Rep., by A.R. Coden, E.W. Brown.

"Multi–Paragraph Segmentation of Expository Text." Proceedings of the 32nd Annual Conference of the Association for Computational Linguistics, Las Cruces, NM 1994, pp. 9–16, by M.A. Hearst.

"An Automated Method of Finding Topic Boundaries", Proceedings of the 32nd Annual Conference of the Association for Computational Linguistics, Student Session, Las Cruces, NM 1994, pp. 331–333.

Text Segmentation by Topic, in Proceedings of the First European Conference on Research and Advanced Technology for Digital Libraries, 1997, pp. 120–129, J.M. Ponte and W.B. Croft.

"Text Based on Similarities Between Words", In Proceedings of the 31st Annual Conference of the Association for Computational Linguistics, Columbus, OH, pp. 286–288, 1993, by H. Kozima.

Combining Knowledge Sources For Discourse Segmentation. In Proceedings of the 33 Annual Conference of the Association for Computational Linguistics, Cambridge, M.A., by Litman, D.J. and Passoneau R.J. 1995.

Text Segmentation Using Exponential Models, CMU Tech Rep. by D. Beeferman, A. Berger and J. Lafferty.

* cited by examiner

Training / learning phase 610

A

Classification phase 615

B

A

B

METHOD AND APPARATUS FOR INDUCING CLASSIFIERS FOR MULTIMEDIA BASED ON UNIFIED REPRESENTATION OF FEATURES REFLECTING DISPARATE MODALITIES

FIELD OF THE INVENTION

This invention relates to the field of multimedia information (media items), such as video and images that have audio associated with it or possibly have text associated with it in the form of captions. More specifically, the invention relates to the field of video and audio processing for supervised and unsupervised machine learning of categorization techniques based on disparate information sources such as visual information and speech transcript. The invention also relates to combining these disparate information sources in a coherent fashion.

BACKGROUND OF THE INVENTION

Beyond data that can be represented in machine readable tabular form and, of course, machine readable text documents, many other forms of media are transitioning to machine readable digital form. For example, visual data such as images and video are increasingly being produced in digital form or converted to digital form. Large collections and catalogues of these media objects need to be organized, similarly to structured text data, but using categorization technology enhanced with new technologies that allow for convenient categorization based on visual and audio content of the media. Such collections of media are managed using multimedia databases where the data that are stored are combinations of numerical, textual, auditory and visual data.

Video is a special, peculiar type of data object in the sense that there is a notion of time associated with this data. These types of data are referred to as streamed information, streamed multimedia data or temporal media. When transporting this data from one location to some other location for viewing purposes, it is important that the data arrives in the right order and at the right time. In other words, if frame n of a video is displayed at time t, frame n+1 has to be at the viewing location at time t plus $\frac{1}{30}$th of a second. Of course, if the media are moved or transported for other purposes, there is no such requirement.

Similarly to text documents, which can be segmented into sections, paragraphs and sentences, temporal media data can be divided up into smaller more or less meaningful time-continuous chunks. For video data, these chunks are often referred to as scenes, segments and shots, where a shot is the continuous depiction of space by a single camera between the time the camera is switched on and switched off, i.e., it is an image of continuous space-time. In this disclosure, we refer to these temporal, time-continuous (but not necessarily space-continuous) chunks of media as media items. These media items include image and video, with associated audio or text and, in general, information stream items composed of disparate sources of information. Examples of media items are commercial segments (or groups) broadcast at regular time intervals on almost every TV channel; a single commercial is another example of a media item or video segment.

Multimedia databases may contain collections of such temporal media items in addition to non-streamed media objects such as still images and text documents. Associated with the media items may be global textual or parametric data, such as the name of the director of the video/music (audio) or the date of recording. Categorization of these media items into classes can be accomplished through supervised and unsupervised clustering and decision tree generation based on the text and, possibly, parametric data.

Multimedia collections may also be categorized based on data content, such as the amount of green or red in images or video and sound frequency components of audio segments. The media item collections have to be then preprocessed and the results have to be somehow categorized based on the visual properties. Categorizing media items based on semantic content, the actual meaning (subjects and objects) of the media items, on the other hand, is a difficult issue. For video, speech may be categorized or recognized to some extent, but beyond that, the situation is much more complicated because of the rudimentary state of the art in machine-interpretation of visual data.

Determining whether a given media item is equal to (a piece of) one of, or is similar to (a piece of) one of, a plurality of temporal media items; or, determining whether it is equal or similar to a media item or equal or similar to a sub segment in a media item collection is another important multimedia categorization problem. A variant here is the issue of determining if a given temporal input media item contains a segment which is equal or similar to one of a plurality of temporal media stream segments or determining if the input stream contains a segment which is equal or similar to a media item in a multimedia database. To achieve this one needs to somehow compare a temporal media item to a plurality of temporal media items or databases of such items. This problem arises when certain media items need to be selected or deselected in a given temporal media item or in a plurality of temporal media items. An example here is the problem of deselecting or suppressing repetitive media items in a television broadcast program. Such repetitive media items can be commercials or commercial segments or groups which are suppressed either by muting the sound channel or by both muting the sound channel and blanking the visual channel.

To develop a procedure for identifying media items as belonging to particular classes or categories, (or for any classification or pattern recognition task, for that matter) supervised learning technology can be based on decision trees, on logical rules, or on other mathematical techniques such as linear discriminant methods (including perceptrons, support vector machines, and related variants), nearest neighbor methods, Bayesian inference, etc. We can generically refer to the output of such supervised learning systems as classifiers.

Supervised learning technology requires a training set consisting of labeled data, that is, representations of previously categorized media segments, to enable a computer to induce patterns that allow it to categorize hitherto unseen media segments. Generally, there is also a test set, also consisting of labeled data, that is used to evaluate whatever specific categorization procedure is developed. In academic exercises, the test set is usually disjoint from the training set to compensate for the phenomenon of overfitting. In practice, it may be difficult to get large amounts of labeled data of high quality. If the labeled data set is small, the only way to get any useful results at all may be to use all the available data in both the training set and the test set.

To apply standard approaches to supervised learning, the media segments in both the training set and the test set must be represented in terms of numbers derived from counting occurrences of features. The relationship between features extracted for the purposes of supervised learning and the content of a media segment has an important impact on the success of the enterprise, so it has to be addressed, but it is not part of supervised learning per se.

From these feature vectors, the computer induces classifiers based on patterns or properties that characterize when a media segment belongs to a particular category. The term "pattern" is meant to be very general. These patterns or properties may be presented as rules, which may sometimes be easily understood by a human being, or in other, less accessible formats, such as a weight vector and threshold used to partition a vector space with a hyperplane. Exactly what constitutes a pattern or property in a classifier depends on the particular machine learning technology employed. To use a classifier to categorize incoming hitherto unseen media segments, the newly arriving data must not only be put into a format corresponding to the original format of the training data, but it must then undergo a further transformation based on the list of features extracted from the training data in the training phase, so that it finally possesses a representation as a feature vector that permits the presence or absence of the relevant patterns or properties to be determined.

The assignment of more than one category to an item is called multiple categorization. Some supervised learning techniques (for example, a few, but not all, approaches using decision trees) do not support multiple categorization. They make the assumption that each item categorized will belong to at most one category, which may not be adequate in some applications. Some supervised learning systems may return a ranked list of possibilities instead of a single category, but this is still slightly deficient for some applications, because such a system might assign categories even to items that should be placed in no category. What are usually most useful are those supervised learning methods that give realistic confidence levels with each assigned category.

The idea behind text feature selection is that the occurrence of the selected features in text associated with an unclassified data item will be a useful ingredient for the development of an automated classification system designed to assign one or more categories to the data item. For text data, the first processing step that must be done is tokenization, i.e., the segmentation of a string of characters into a string of words or tokens. However, the representation of an item of text data as a string of arbitrary words, with all of the meaningful linguistic structures it implicitly contains, is often simply too complicated and rich for a computer to handle. Even if one does no parsing of the text, there may well be too many potential features, in which case some distillation is needed. Luckily, single words themselves have been seen to comprise an adequate set of features for many supervised learning problems. Sometimes it is useful to identify the part of speech of each word, thus distinguishing between an instance of the verb walk and the noun walk. (This is called part-of-speech tagging.) This only scratches the surface. Modern techniques of computational linguistics permit the identification of complex features in text, but with rising complexity comes vast numbers of features. At any rate, after the training set is prepared, and after the text associated with it is identified, a list of those text features deemed particularly relevant to the particular classification task at hand is automatically extracted. Call the features in this list the extracted text features, and call the process of building the list text feature extraction. There is an issue in regard to whether a single list of features, called in this setting a global dictionary, is created or whether there is a separate list for each category, called in this context local dictionaries. The resolution of this issue can depend on the details of the supervised learning technique employed, but, in applications related to text, local dictionaries generally give better performance. There are a variety of criteria for judging relevance during feature extraction. A simple one is to use absolute or normalized frequency to compile a list of a fixed number n of the most frequent features for each category, taking into account the fact that small categories may be so underpopulated that the total number of features in them may be less than n. More sophisticated techniques for judging relevance involve the use of information-theoretic measures such as entropy or the use of statistical methods such as principal component analysis.

After text feature extraction, a new vector representation of each text item associated with the training data is then extracted in terms of how frequently each selected feature occurs in that item. The vector representation may be binary, simply indicating the presence or absence of each feature, or it may be numeric in which each numeric value is derived from a count of the number of occurrences of each feature.

A large body of prior art of video processing for video identification, detection, categorization, and classification is concerned with the detection of commercials in a video stream, i.e., the media item is a commercial or a sequence of commercials. This is not a categorization problem per se, but rather a detection problem. The detection of one class (or category) of interest, though, is in itself a categorization problem, where the categories are "category-of-interest" and "unknown."

Many methods rely on the fact that commercials are often surrounded by blank frames, changes in audio/brightness level, simple representations of intermediate frames and more global dynamic properties that typically hold for commercials. An example of a method and apparatus for detection and identification of portions of temporal video streams containing commercials is described in U.S. Pat. No. 5,151,788 to Blum. Here, a blank frame is detected in the video stream and the video stream is tested for "activity" (properties such as sound level, brightness level and average shot length). U.S. Pat. No. 5,696,866 to Iggulden et al. extend the idea to detecting a "flat" frame. In addition to a frame being flat at the beginning and end of a commercial, they include that the frame has to be silent. Additional features, such as changes in the audio power or amplitude and changes in brightness of the luminance signal between program and commercial segments, of the video signal are used in U.S. Pat. No. 5,343,251 to Nafeh.

Many techniques for detecting commercials, reduce commercials to a small set of representative frames, or key frames, and then use image matching schemes to match the key frames. Here, each particular commercial has some representation, instead of using generic attributes above that describe the category of commercials. For example, U.S. Pat. No. 5,708,477 to S. J. Forbes et al. uses the notion of a list of abbreviated frames for representing commercial video segments. An abbreviated frame is an array of digital values representing the average intensities of the pixels in a particular portion of the video frame. Upon detection of a scene change in the live video stream, computed and stored abbreviated frames are matched and commercial is detected and classified (if present in memory). A technique that uses more sophisticated frame representations is presented in reference:

J. M. Sanchez, X. Binefa, J. Vitria, and P. Radeva, Local color analysis for scene break detection applied to TV commercial recognition, Third International Conference, Visual'99, Amsterdam, June 1999, pp. 237–244.

(This reference is incorporated herein in its entirety.) Each commercial in the database is represented by a number of color histograms, or color frequency vectors, for a representative frame for each shot in the commercial. The shot boundaries of a commercial are detected by some shot boundary detection algorithm (finding scene breaks). Commercials are detected in a live video stream by comparing all the color histograms of all the commercials to the color histograms representing a shot in video stream. No temporal information is incorporated in the representation of the commercial.

All this prior art falls in the realm of detection of video copies. The use of image feature histograms, where the images are particular video frames, like shot boundaries, have been popularized in the area of image recognition, and, later on in the area of image search. Color histograms (color frequency distributions) are the most widely used, in particular, the Red Green Blue (RGB) and the Hue Saturation and Intensity (HSI). Other color spaces that could be used are those defined by the CIE (Commission Internationale de l'Eclairage—the International Committee for Illumination). These spaces are CIE L*u*v* hue angle and saturation and CIE L*a*v* hue angle and saturation. Ratios of color components such as the red response divided by the green response (after appropriate gamma correction) also yield intensity independent color measures. Another popular method is to divide each response by the average response across all spectral bands, such as $Rn=R/(R+G+B)$, to produce a set of fractional color components (which sum to one).

A particular instance of image database search, is image classification, or image content recognition. In an image classification problem, typically, the number of classes is smaller than the number of images in an image database. An example of image classification is found in:

R. Bolle, J. Connell, G. Taubin, N. Haas, R. Mohan, "VeggieVision: A produce recognition system," in Proc. Third IEEE Workshop on Applications of Computer Vision, pp. 244–251, December 1996.

This reference is incorporated herein in its entirety. Color histograms are used in this work, but the use of color frequency distributions is extended to the use of histograms to represent other features that are used for image/object classification. Histograms are a compact representation of a reference image that do not depend on the location or orientation of the object in the image, or, at least, depend only a little because of quantization effects. For example, visual texture is a feature used in "VeggieVision" to Bolle et al. As opposed to color, texture is a visual feature that is much more difficult to describe and to capture computationally. It is also a feature that cannot be attributed to a single pixel but rather is attributed to a patch of image data. The texture of an image patch is a description of the spatial brightness variation in that patch. This can be a repetitive pattern of primitives (texels), or, can be more random, i.e., structural textures and statistical textures. Computational texture measures are either region-based or edge-based, trying to capture structural textures and statistical textures, respectively. In "VeggieVision" to Bolle et al., a texture representation of an image, image class, or image category, then, is a one-dimensional histogram of local texture feature values. Shape can also be represented in terms of frequency distribution. The information available to work with is the two-dimensional boundary of (say) a segmented image. Boundary shape is a feature of multiple boundary pixels and is expressed by a local computational feature, for example, curvature. Local curvature is estimated by fitting a circle at each point of the boundary. After smoothing, this boundary shape feature is quantized and a histogram is computed. Instead of over an area, such as for color histograms, these histograms are computed from a collection of image pixels that form the boundary of the object image. Finally, size of image segments is another feature of the images that is important in "VeggieVision" to Bolle et al. A method that computes area from many collections of three boundary points is proposed. Three points determine a circle and, hence, a diameter D. A histogram of these diameter estimates is then used as a representation for objects (in the image) size.

Many video copy detection solutions use some spatial representation of frames or images (spatial representations as described above) and some temporal representation of the times between the frames, i.e., a spatial-temporal representation. Indyk et al. have proposed a method for video copy detection, solely using the distance (time) between shot breaks in the video as the feature of the video.

P. Indyk, G. Iyengar and N. Shivakumar, Finding pirated video sequences on the Internet. tech. rep., Stanford Infolab, February 1999.

This method (incorporated herein by reference) is somewhat limited in the richness of the representation. Other video copy detection algorithms use some form of image matching (visual data) combined with temporal evidence integration. A method for detecting arbitrary video sequences, including commercials, is described in (incorporated herein by reference):

R. Mohan, "Video Sequence Matching", International Conference on Acoustics, Speech and Signal Processing, (ICASSP), May 1998.

Mohan defines that there is a match between a given video sequence and some segment of a database video sequence if each frame in the given sequence matches the corresponding frame in the database video segment. That is, the matching sequences are of the same temporal length; matching slow-motion sequences is performed by temporal sub-sampling of the database segments. The representation of a video segment is a vector of representations of the constituent frames in the form of an ordinal measure of a reduced intensity image of each frame. Before matching, the database is prepared for video sequence by computing the ordinal measure for each frame in each video segment in the database. Finding a match between some given action video sequence and the databases then amounts to sequentially matching the input sequence against each sub-sequence in the database and detecting minimums. This method introduces the temporal aspects of the video media items.

All these color-based image methods are subject to digitizing and encoding artifacts, like color variations. See A. Hampapur and R. M. Bolle, Feature based Indexing for Media Tracking. In Proc. of Int. Conf. on Multimedia and Expo, August 2000, pp. 67–70 (Hampapur et al.). To circumvent color variations Hampapur et al. have, instead, used other features that are invariant to color variations. In a first, off-line indexing phase representations for a set of known reference media items are computed and stored in an index structure. For each segment, a set of intervals is determined and from each key interval, a set of feature values is extracted from portions of the video frames. The values are quantized and index tables are built where feature values point to the reference media items. In the search and detection phase, a real-time process of computing and quantizing features from a target media stream is done in the same fashion. Additionally, counters are initialized for each of the known media items. When computed feature values point to a known media item, the corresponding counter is incremented. High values of the counter indicate the presence of a known media item in the target stream. An interesting thing to note here is that any feature type, such as, color, edges or motion, can be used in this method. Further, features are not computed on a frame basis (as in the above methods) but rather from regions within the frame and even regions of consecutive frames (local optical) flow. Detecting media items is further accomplished with a computational complexity that is sub-linear.

Reference Hampapur et al. is incorporated herein by reference.

What all these above mentioned references have in common is that the visual features extracted from the video do not have a whole lot of semantic meaning, e.g., a color, in and of itself, does not say much about the semantic content of the image or video. See Lienhart, C. Kuhmunch and W. Effelsberg, "On the detection and recognition of television commercials." In Proc. of the IEEE Conf. on Multimedia Computing and Systems, 1997 (Lienhart et al.). Lienhart et al. take things a step further. They describe a system for performing both feature based detection and recognition of known commercials. The visual features that are used have spatial-temporal aspects. They use directly measurable features, such as, a spot being no longer than 30 seconds, spots being separated by a short break of 5–12 monochrome frames, and the volume of the audio signal being turned up. In addition, they use indirectly measurable features, like the fact that spots are full of motion, animated, and full of action. In addition, commercial spots have many still frames and many of them contain textual information. It is important to note that these are the beginnings of image processing techniques for extracting semantic information, such as action and motion, from video frames.

Reference Lienhart et al. is incorporated herein by reference.

Now consider B-T Truong, S. Venkatesh and C. Dorai, "Automatic Genre Identification for Content-Based Categorization," in Proc. Int. Conf. On Pattern Recognition, Sept. 2000, pp. 230–233 (B-T Truong et al.), incorporated herein in its entirety. The authors take the use of extracted semantic features a step further. The extracted visual features have cinematographic meaning, such as, fades, dissolves and motion features. Motion features are incorporated in terms of "quiet" visual scenes (the absence of motion) and "motion runs," unbroken sequences of motion, where motion is defined in terms of luminance differences between frames. In addition, the authors use color features in terms of color coherence over time, high brightness and high saturation. The authors used the well-known C4.5 decision tree induction program to build a classifier for genre labeling.

Another technique for video categorization is described in N. Dimitrova, L. Agnihotri and G. Wei, "Video classification based on HMM using text and faces," (Dimitrova et al.).

Herein, first fifteen labels defined based on these visual features (by text, the authors, mean superimposed text in the video) are defined, examples are "talking head" and "one text line." A technique using Hidden Markov models (HMM) is described to classify a given media item into predefined categories, namely, commercial, news, sitcom and soap. An HMM takes these labels as input and has observation symbols as output. The system consists of two phases, a training and a classification stage. Reference Dimitrova et al. is incorporated herein in its entirety.

It is important to note that Dimitrova et al. does not use text in machine (ASCII) readable form, it uses the presence or absence of text block(s) in the video frames.

On the other hand, such machine-readable ASCII text, along with, visual features is used for video categorization in M. A. Smith and T. Kanade, "Video skimming for quick browsing based on audio and image characterization," Carnegie Mellon University, Tech. Rep. CMU-CS-95-186, June 1995 (Smith et al.).

Reference Smith et al. is incorporated herein in its entirety. A sophisticated video database browsing systems is described, the authors refer to browsing as "skimming." Much emphasis is placed on visual analysis for video interpretation and video summarization (the construction of two-dimensional depictions of the video to allow for non-linear access). Visual analysis include scene break detection, camera motion analysis, and object detection (faces and superimposed text). The audio transcript is used to identify keywords in it. Term frequency inverse document frequency techniques are used to identify critical words. Words that appear frequently in a particular video segment but occur infrequently in standard corpuses receive the highest weight. In Smith et al. the speech recognition is not automated yet, and closed-captioning is used instead. Video search is accomplished through the use of the extracted words as search keys, browsing of video summaries then allows for quickly finding the video of interest.

A content-based video browsing system that applies linguistic analysis to the closed captioning is described in I. Mani, D. House, M. Maybury, M. Green, "Towards content-based browsing of broadcast news video," in Intelligent Multimedia Info Retrieval, Issue 1997, M. T. Maybury (ed.), pp 241–258. AAAI Press/The MIT Press (Mani et al.).

The reference Mani et al. is incorporated herein in its entirety.

Emphasis in Mani et al. is placed on topic and story segmentation. Assuming that one could associate terms in a document with subjects in a thesaurus, the authors hypothesize that as topics change, the associated thesaural subjects change as well. The work is based on a thesaurus of 124 subject categories, with text summaries represented in a 124-dimensional space. Well-known subject similarity measures as the angle between subject vectors are used. The issue then is detecting a change in topic by detecting a change in angle. The subject vector, however, has to be computed over a certain video time interval, the authors refer to this as a block. The block size is important here. The authors do not arrive at a universally usable block size and contemplate adjustable block size. Further, the authors consider the use of cues that closed-captioners insert, in particular ">>" indicates a change of speaker, while ">>>" indicates a change in topic. These cues were found to be unreliable. Therefore, the authors investigate the use of what they call "sign off" cues. These are specific textual cues that indicate a change in topic, as "Goodnight Jim" in the MacNeil-Lehrer NewsHour shown in the past on PBS. The authors use no visual cues to detect story boundaries.

Finally, the use of automated speech recognition of the audio track to determine story and topic is being used more and more since speech recognition technology is steadily improving. The use of automated speech recognition can be classified as (1) dictation applications, (2) conversational or transactional applications, and (3) indexing applications. A comprehensive and excellent overview of the latter application is presented in Coden et al.:

A. R. Coden, E. W. Brown, "Speech Transcript Analysis for Automatic Search," IBM Research Tech. Rep., IBM Research Tech. Rep., (Coden et al.).

This reference (Coden et al.) is incorporated herein by reference. All of the video indexing, video summarization, video segmentation, and video categorization and subject detection technologies based on automated speech recognition, described in Coden et al., use no or very little visual information.

There is also quite some prior art dealing with segmenting documents (discourse) into portions corresponding to topics. This is typically referred to as "discourse segmentation" to distinguish it from character segmentation from image or video for optical character recognition (OCR). The term "discourse," further is more general because it includes spoken language, which is transcribed from wave forms to text (e.g., ASCII) for analysis purposes. In the following discussion, we will use the terms interchangeably.

One popular recurring idea is to partition the discourse into fragments, and to measure the "similarity" of one fragment to another, using the cosine metric, which is the dot product of the word occurrence frequencies. (Morphological analysis is usually employed first, to reduce inflected, declined, etc., words to their base forms—"stemming" or "lemmatization").

Reference Hearst, M. A., Multi-paragraph segmentation of expository text. Proceedings of the 32nd Annual Conference of the Association for Computational Linguistics, Las Cruces, N.Mex., 1994, pp. 9–16. (Hearst), is incorporated herein by reference.

Hearst does this by partitioning the entire document into tiles of more or less uniform size, the size being on the order of a paragraph. She then plots C (j, j+1) versus j, for j=1, ..., N−1, where N is the number of tiles in the document, and C is the inter-tile co-occurrence (or similarity) coefficient. After smoothing of this curve, local minimal values indicate discourse boundaries, since minimal similarity indicates probable different topics of the tiles.

Also incorporated by reference is J. C. Reynar, "An automated method of finding topic boundaries," Proceedings of the 32nd Annual Conference of the Association for Computational Linguistics, student session, Las Cruces, N.Mex., 1994, pp. 331–333, (Reynar). Reynar divides a discourse at a very fine grain: the individual word. He then records the correspondences (0 or 1) with every other word in an N×N matrix, where N is the document size in words. Then any choice of discourse boundaries defines a set of square sub-matrices of the matrix lying along the main diagonal, each sub-matrix representing the intra-segment co-occurrence values. Reynar defines the best discourse segmentation to be the one that minimizes the density of 1's in the extra-segmental co-occurrence regions of the matrix. Here the extra-segmental regions are all matrix entries not lying in the intra-segmental sub-matrices. He calls his technique dotplotting.

Further references Ponte and Croft, and Kozima are incorporated herein by reference:

Ponte J. M. and Croft W. B. 1997, Text Segmentation by Topic, in Proceedings of the First European Conference on Research and Advanced Technology for Digital Libraries, pp. 120–129. (Ponte and Croft)

Kozima, H. 1993 Text Segmentation based on similarity between words. In Proceedings of the 31st Annual Conference of the Association for Computational Linguistics, Columbus, Ohio. pp. 286–288, (Kozima)

Ponte and Croft, use a similar technique, except that they "expand" each word in a partition by looking it up in a "thesaurus" and taking all of the words in the same concept group that the seed word was in. (This is an attempt to overcome co-ocurrence, or correspondence, failures due to the use of synonyms or hypernyms, when really the same underlying concept is being referenced.) Ponte and Croft bootstrap the correspondences by developing a document-specific thesaurus, using "local context analysis" of labeled documents. Then, to find the best co-occurence sub-matrices, instead of exhaustively considering all possibilities, they use a dynamic programming technique, minimizing a cost function. Kozima et al. perform a similar word "expansion," by means of "spreading activation" in a linguistic semantic net. Two words are considered to be co-occurrences of, or corresponding to, each other if and only if each can be reached from the other by less than m steps in the semantic net, for some arbitrarily chosen value of m.

There are feature-based approaches, too, that do not rely on word co-occurrence or correspondences, for example, Litman and Passoneau. Here a set of word features is developed. These features are derived from multiple knowledge sources: prosodic features, cue phrase features, noun phrase features, combined features. A decision tree, expressed in terms of these features, is then evaluated at each potential discourse segment boundary to decide if it is truly a discourse segmentation point or not. The decision expression can be hand-crafted or automatically produced by feeding training data to a learning system such as the well-known C4.5 decision tree classification scheme Reference [Litman D. J. and Passoneau R. J. 1995. Combining multiple knowledge sources for discourse segmentation. In Proceedings of the 33rd Annual Conference of the Association for Computational Linguistics, Cambridge, Mass.], (Litman and Passoneau), is incorporated herein by reference.

Now consider [D. Beeferman, A. Berger and J. Lafferty, Text Segmentation Using Exponential Models, CMU Tech Rep], (Beeferman, et al.) that is incorporated herein by reference and introduces a feature-based discourse segmentation technique for documents. The idea is to assign to each position in the data stream a probability that a discourse boundary occurs. Central to the approach is a pair of tools: a short- and a long-range model of language. The short-term model is a trigram model, the conditional probability of a word based on the two preceding words. The long-term model is obtained by retaining a cache of recently seen trigrams. Determining a discourse boundary in statistical terms is cast by formulating the probability of a boundary both in terms of the short- and the long-term model. Maximal values of this probability then indicate discourse boundaries. Beeferman et al. touch upon, but do not implement, multimedia document (containing audio, text and video) discourse segmentation. Examples of short-long-term features that they propose are: "is there a sharp change in video stream in the last 20 frames," "is there, a blank video frame nearby," and "is the a match between the spectrum of the current image and the spectrum of the image near the last segment boundary."

In sum, we can (roughly) distinguish the following approaches to media item categorization and media item subject detection; or, more generally, media item classification. The approaches are classified based on the features that are used. The features are derived from the raw analog signal, visual features computed from digitized media items frames (images), textual features directly decoded from the closed-caption, and textual features obtained from automatically computed speech transcripts. Here is a list of common kinds of features used to classify multimedia items:

Raw analog visual and audio signals.

Visual features computed from individual frames.

Visual features computed from individual frames plus temporal features.

Visual features computed from individual frames, temporal features plus audio features.

Semantic visual features computed from individual frames plus temporal features.

Semantic visual features computed from multiple frames and temporal features.

Closed-captioning (predetermined keyword spotting) plus visual features.

Speech transcript (predetermined keyword spotting) plus visual features.

Using only textual data, either speech transcript or closed-captioning.

Speech transcript computed from audio track.

Speech transcript computed from audio track plus rudimentary visual features.

Text document analysis.

PROBLEMS WITH THE PRIOR ART

Some of the problems with the prior art are now presented.

1. The prior art media item categorization techniques are based either only on visual information or only on textual information.
2. The media item representations are not designed to handle both textual and visual features that can be extracted from media items. This inherently limits the number of media items that can be distinguished, i.e., the discrimination power of the representations will not extend beyond a certain (not very large) number of different video categories.
3. The media item representations are not designed to handle in a coherent fashion both textual and visual features that can be extracted from media items.

OBJECTS OF THE INVENTION

An object of this invention is an improved system and method for categorizing multimedia items.

An object of this invention is an improved system and method for categorizing multimedia items using both textual and visual features.

An object of this invention is an improved system and method for categorizing multimedia items while handling both textual and visual features coherently.

An object of this invention is a system for performing categorizing of multimedia items in a large number of categories (classes).

SUMMARY OF THE INVENTION

The present invention is a categorization methodology for categorizing multimedia items. Examples include video and images with captions. There are two phases: a learning phase, whose purpose is to induce a classifier, and categorization phase, in which the classifier may be applied to categorize media items.

In the learning phase, off-line supervised or unsupervised learning, using a training set of labeled or unlabeled multimedia items as appropriate, is employed to induce a classifier based on patterns found in a unified representation as a single feature vector of disparate kinds of features, linguistic and visual, found in a media item under consideration. The unified representation of disparate features in a single feature vector will enable a classifier to make use of more complicated patterns for categorization, patterns that simultaneously involve linguistic and visual aspects of the media, resulting in superior performance as compared with other less sophisticated techniques. First, for each media item, the accompanying text is represented by a sparse textual feature vector. Secondly, for each media item, a set of key frames or key intervals (key intervals, for short) is determined, which can either be regularly sampled in time or based on the information content. From each key interval, a set of features is extracted from a number of regions in the key intervals. These regions can be different for each feature. The extracted features are coarsely quantized. Hence, each key interval is encoded by a sparse textual feature vector and a sparse visual feature vector. The sparse textual feature vectors and the sparse visual feature vectors may optionally need to be further transformed to assure their compatibility in various ways, such as (1) with respect to range of the values appearing in the two kinds of vectors or (2) with respect to the competitive sizes of the two kinds of vectors with respect to some norm or measure. The textual feature vector and the visual feature vector are combined by concatenation to produce a unified representation in a single vector of disparate kinds of features. Having created the unified representation of the training data, standard methods of classifier induction are then used.

In categorization phase, the process of computing sparse textual feature vectors and sparse visual feature vectors for a media item is repeated. The classifier induced in the learning phase is used to identify the class (category) of a media item.

A standard method of classifier induction is the construction of a k-nearest-neighbor classifier based on training data whose elements are labeled with the classes to which they belong. A k-nearest-neighbor classifier is one that classifies vectors using some measure of similarity. It assigns to a vector whose class is unknown the class to which a majority of its k nearest neighbors in the training data belong. The simplest kind of a k-nearest-neighbor classifier is one in which k is taken to be 1. The categorization phase for this simplest kind of k-nearest-neighbor classifier amounts to, for an item whose class is unknown, finding its nearest neighbor, which is the most similar item in the training data to that item according to a similarity measure, and assigning to the unknown item the class of its nearest neighbor. This invention explicitly includes the use of these fairly simple classifiers (as well as their more complex classifiers, such as support vector machines and various classifiers based on statistical analysis of the vectors representing the training data) among the standard methods of classifier induction to which reference was made above. In particular, this invention includes the solution of the problem of finding the media item in a reference collection that is most similar to a hitherto unconsidered media item by ascertaining the degree of similarity between the vector representations of the hitherto unconsidered media item and each reference media item, as long as the vector representations that are compared are constructed as described above, thereby providing a unified representation of disparate modalities of the media items being compared.

BRIEF DESCRIPTION OF THE FIGURES

The foregoing and other objects, aspects and advantages will be better understood from the following non limiting detailed description of preferred embodiments of the invention with reference to the drawings that include the following.

DETAILED DESCRIPTION OF THE INVENTION

This system categorizing media items has two distinct aspects. The first aspect is called the training phase which builds representations of the reference media items; the second phase is called the categorization phase, where instances media items are categorized. The training phase is an off-line process that involves processing of the reference media items to form a set of one or more categories. The categorization phase classifies a media item in a collection of such items by processing the media item to extract audio and visual features and using the media item class representations.

Figure 1:
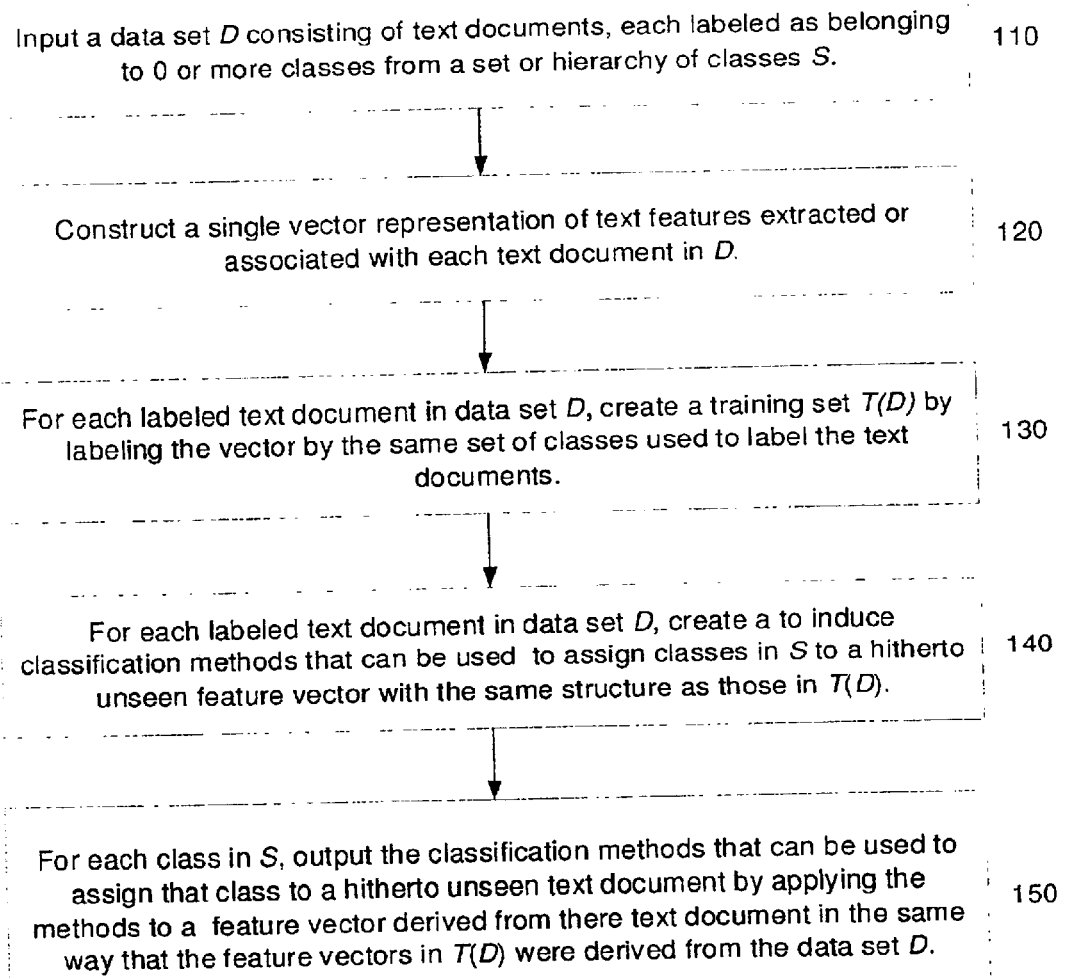
FIG. 1 is a prior art block diagram of the state-of-the-art categorization technology for document categorization.

FIG. 1 shows a prior art flowchart for a system 100 for categorizing text documents. In step 110, a set of text documents is input to the system. Each text document is labeled as belong to a class $S=c_i$, i=1, . . . , C. The classes S can be hierarchical, in the sense that each class S, can be recursively divided up into a number of subclasses, $S=S_{subclass1}, S_{subclass2}, \ldots, S_{subclassN}$. In 120 a single vector is computing representing the text in each document in D. Such a vector V is a large-dimensional vector with entry n equal to 1 or 0, respectively, if word n is present, or not, in the document; or, such a vector V can be a large-dimensional vector with entry n equal to f where is the number of times word n is present in the document. Examples of source of text vectors 120 include: close captions, open captions, captions, speech recognition applied to one or more audio input, semantic meanings derived from one or more audio streams, and global text information associated with the media item. In step 130 (FIG. 1) each vector V is labeled the same as the corresponding document. Step 140 induces machine-learned classification methods for classifying unseen vectors $\underline{V}$ representing new unclassified documents. Finally, Box 150, infers classification method to classify (categorize) unknown documents $\underline{D}$, represented by feature vectors $\underline{V}$.

Figure 2:
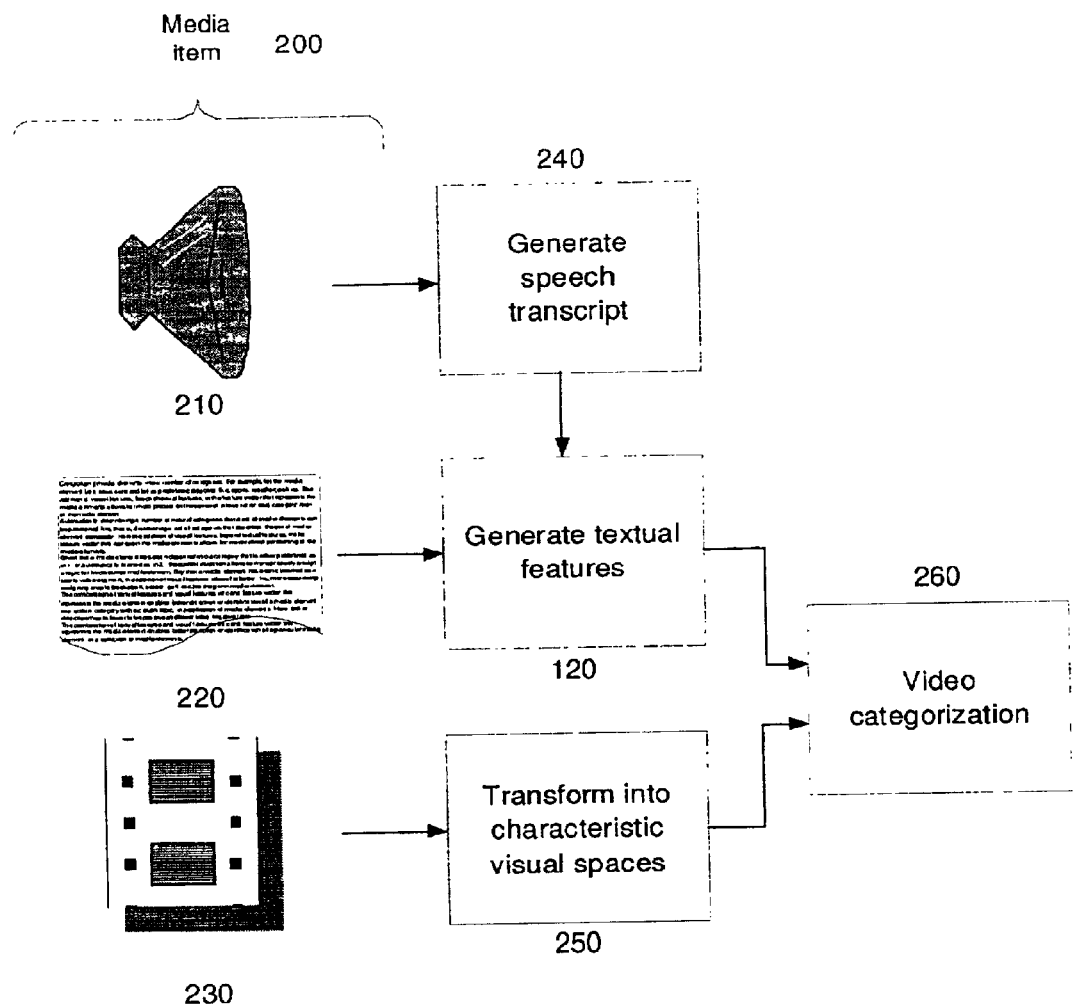
FIG. 2 is a flowchart showing the disparate sources of information that are used for media item categorization

FIG. 2 shows a diagram of the various disparate input sources to the categorization process. The general multimedia input sources is media item 200. This input source consists of audio 210, text documents 220 and visual input 230. Using the audio input, a speech transcript in computed (240) applying well-known techniques in the prior art. Possibly, if needed and available, a closed- or open-captioning (220) of the visual footage (230) is used to generate textual features 120 (very much in line with step 120 in FIG. 1). Thirdly, the visual track 230 is transformed into characteristic visual feature spaces (250). The current invention puts these disparate sources of information, i.e., speech transcript representation 240, closed-caption representation (general textual features) 120, and visual features transformed into characteristic spaces 250 together in a unified framework. This framework allows the treatment of these sources of information in a coherent fashion.

Figure 3:
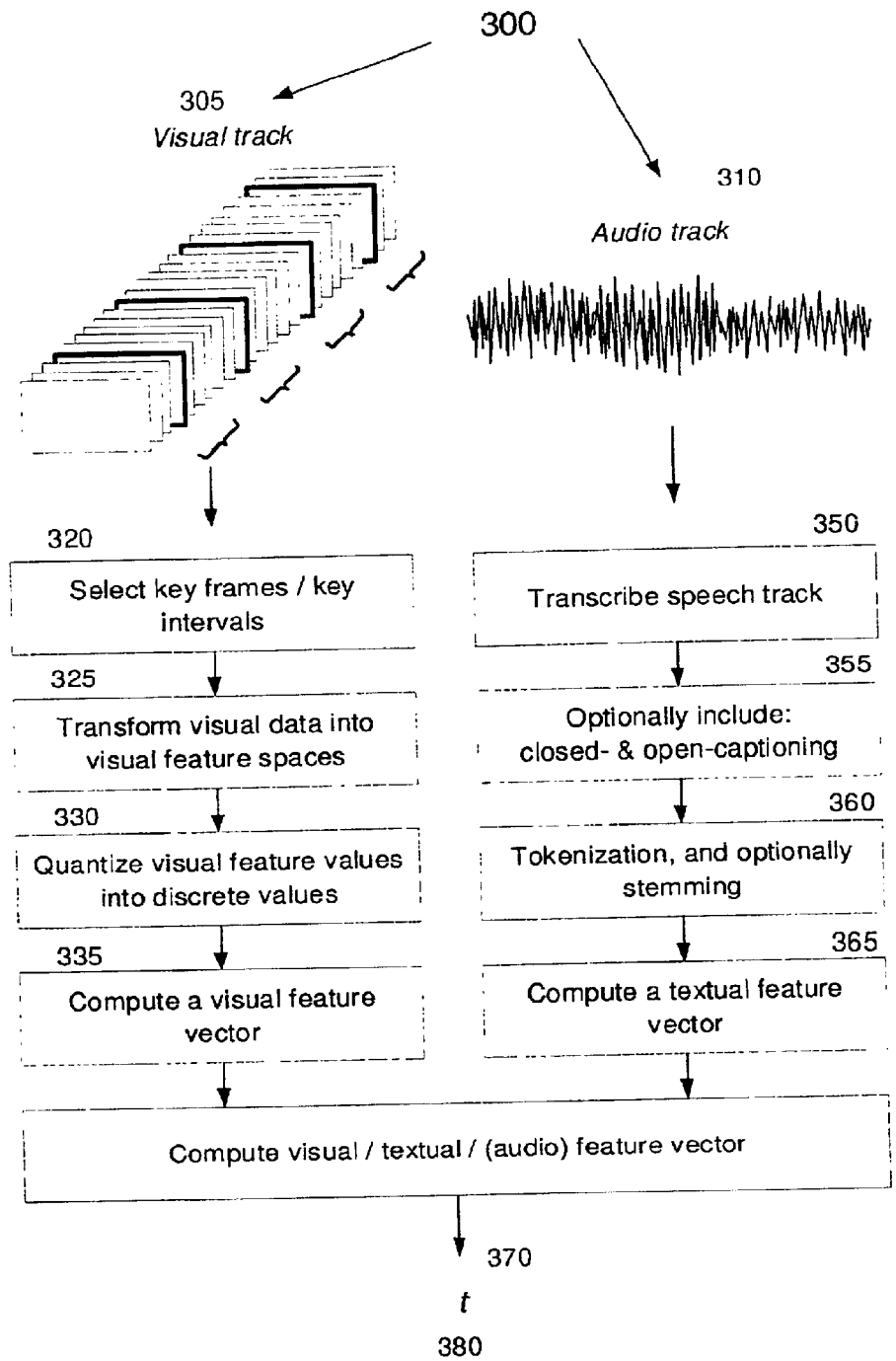
FIG. 3 is a more specific flowchart describing the combined computation of the disparate sources of information from a media item.

FIG. 3 shows a more specific way of processing the multimedia media item for categorization purposes. The input data, media item (300), is processed separately in terms of the visual track, 305, and the audio track, 310. The visual track 305 and the audio track are processed independently and concurrently. From the visual track (305), characteristic key frames or key intervals are selected 320. These characteristic pieces of video are transformed into characteristic visual spaces 330 that in some way characterize the video clip in terms of visual features associated with the video categories. These visual space representations are transformed into sparse visual feature vectors (335). The audio track 310 is automatically transcribed into a precise as possible transcript. Additionally, possible available closed- and open-captioning is included in the textual description of the media item 300. In 360 the textual content associated with the current media item 330 is tokenized (i.e., the sequence of characters in the text is divided into words and other meaningful tokens) and, optionally, stemmed (i.e., tokens are replaced by standard forms, roots, or morphological stems in order to reduce the size of the feature space ultimately constructed, such as replacing the word cats by cat, the word men by man, the work came by come, etc. Step 365 computes a textual representation vector of the current media item 300 under consideration. In output 370, a collective coherent textual and visual representation of the media item is accomplished established. An out put vector 380 is the result of this process.

Figure 4:
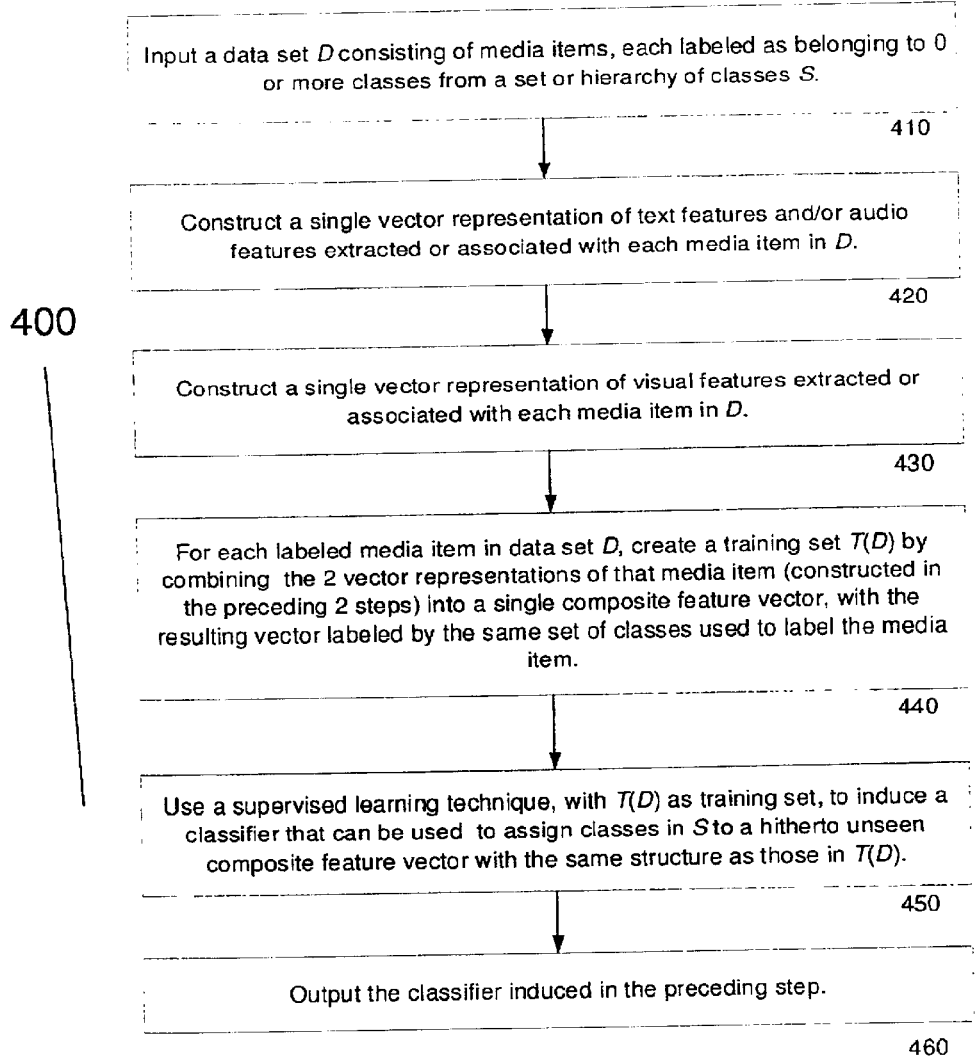
FIG. 4 is a detailed flowchart for inducing classifiers for categorizing media items that comprise of disparate sources of information.

FIG. 4, flowchart 400, shows, when supervised learning is employed, the complete integration of disparate media modules in the learning phase, i.e., the induction from labeled data of a classifier whose purpose is media item categorization. In the initial step 410, the system accepts as input a data set D consisting of media items, each labeled as belonging to 0 or more classes from a set or hierarchy of classes S. Steps 420 and 430 may be permuted or carried out simultaneously. In 420, the system constructs a single vector representation of text features and/or audio features extracted or associated with each media item in D. These features may be present in a transcript produced by voice recognition software, in close-captioned text, or in open-captioned text. Some features may indicate the presence of or the character, appropriately quantized, of other audible characteristics of the media segment, such as music, silence, and loud noises. In 430, the system constructs a single vector representation of the visual features extracted or associated with each media item in D. In 440, for each labeled media item in the data set D, the system constructs a training set T(D) by combining the two vector representations of that media segment (constructed in 420 and 430) into a single composite feature vector, with the resulting vector labeled by the same set of classes used to label the media item. Optionally, in 440, before combining the vector representations, the system may uniformly transform one or both of those set of representations in order to assure compatibility. Among the ways that incompatibility may arise may be (1) a marked difference in the number of values that may appear as components of the vectors and (2) a marked difference in the norms or sizes of the vectors present in the two sets. The exact criterion for what constitutes a marked difference between to the sets of vectors will depend in practice on the particular technique of supervised learning being employed, and it may idiosyncratically depend on the data set D. Thus, in practice, the criterion may be experimentally determined by the evaluation of different classifiers induced under different assumptions. At any rate, in 440, the system ultimately produces, normally by concatenation of the (possibly transformed) feature vectors produced in 420 and 430, a composite labeled feature vector is ultimately produced for each media item in D. In 450, the system uses a supervised learning technique—a wide variety of them exist—with T(D) as training data to induce a classifier that can be used to assign classes in S to a hitherto unseen feature vector with the same structure as those in T(D). In 460, the system outputs the classifier induced in 450, as well as any parameters, information or settings needed to represent hitherto unseen media items as unified feature vectors with exactly the same format and structure as those in T(D), so that the classifier induced in 450 can be legitimately applied to those vectors.

Figure 5:
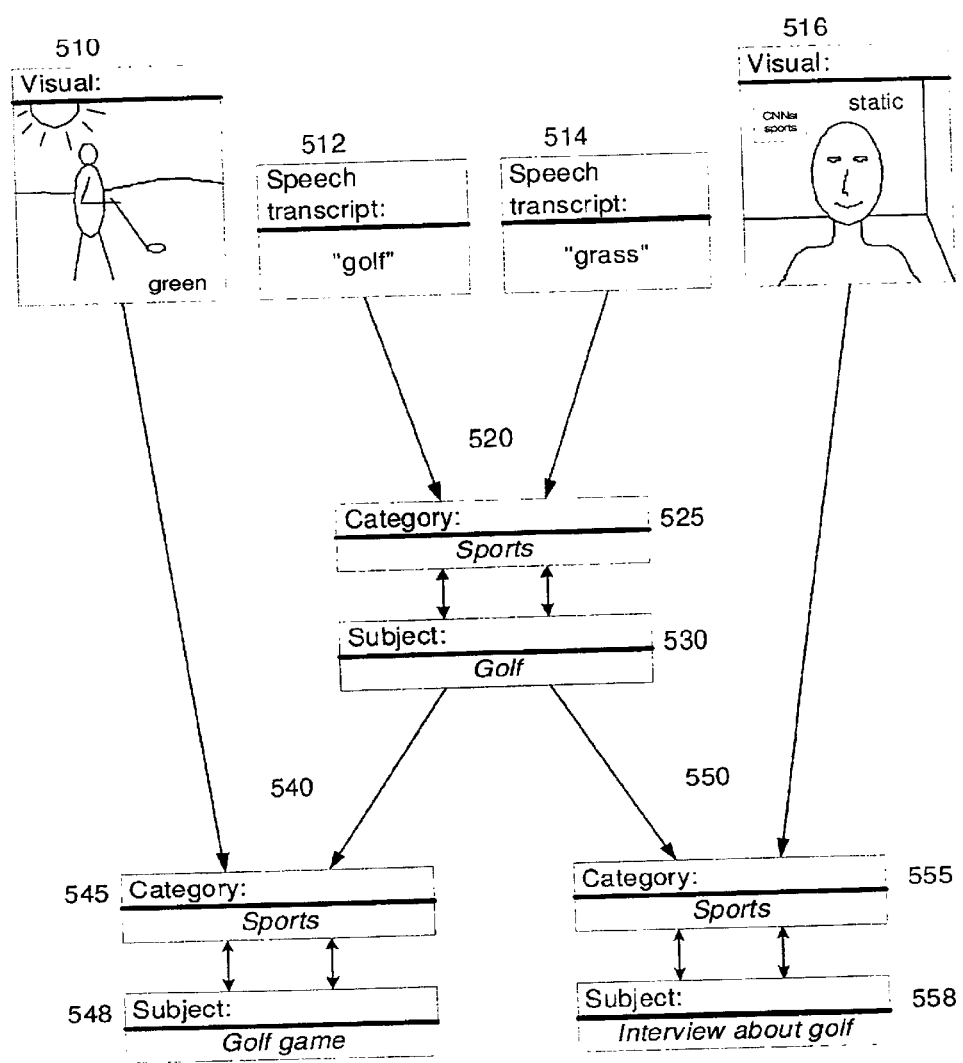
FIG. 5 is an example of a decision rule induced by the training processes that combines visual and textual information.

FIG. 5 shows a typical example of video classification rules derived from disparate information sources such as the visual and audio track. These sources are visual, 510 and 516, and auditory, 512 and 514. In the speech track the words "golf" and "grass" (512 & 514) are detected. The combination of these two words point 520 point to the fact that we are dealing with a piece of video footage of category sports 525, with the subject golf 530. However, the visual circumstances in the topic of golf 510, where the actual game of golf is played, and a relatively static scene 516 of a "talking head" indicating a golf interview. Items 510 and 520 together infer that the medium items has category "sports" 545 with subject "golf game" 548. On the other hand, when the footage is relatively static, 516, it is clear that the category of the footage is sports again "555" but that the subjects is an interview about golf "558."

Figure 6:
FIG. 6A is a block diagram of the learning/training phase of one preferred system embodying the present invention.
FIG. 6B is a block diagram of the classification phase of one preferred system embodying the present invention.
Figure 6:
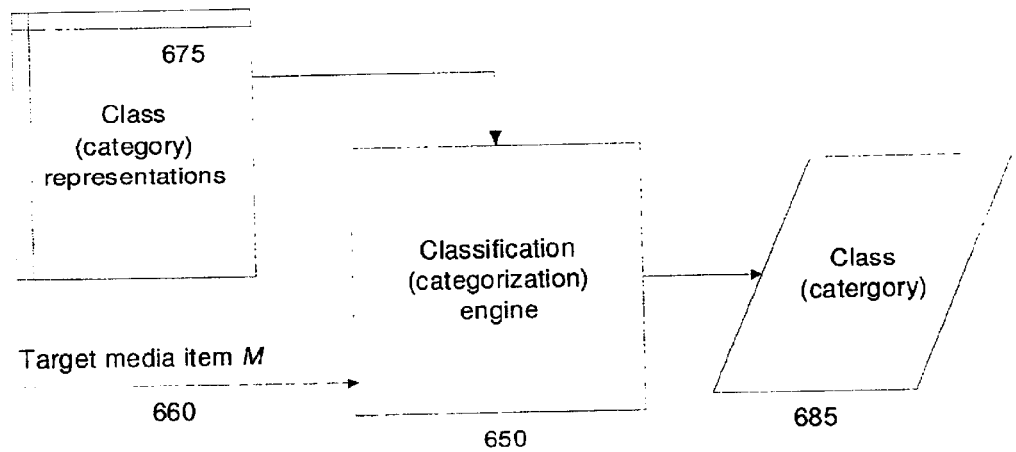

FIG. 6 shows a block diagram of the system architecture. The top portion (FIG. 6A) shows the supervised/unsupervised phase 610, i.e., the part of the system that handles the computation of classes and learns a representation (i.e., class/category representations 675) of the reference media items 610. The learning is achieved through training engine 620, which computes the class representations 675. The bottom portion (FIG. 6B) shows the classification/categorization phase 615 using the classification/categorization engine 650. Here features are computed from the target incoming medium item M 660. The class/category of medium item 660 is reported to 685. Each of these phases is described in detail below.

The training phase, as shown in FIG. 6A, includes the key frame or key interval (hereafter referred to as key interval) selection step, the visual feature generation step, and the visual feature vector population step. Each of these steps is discussed below.

Figure 7A:
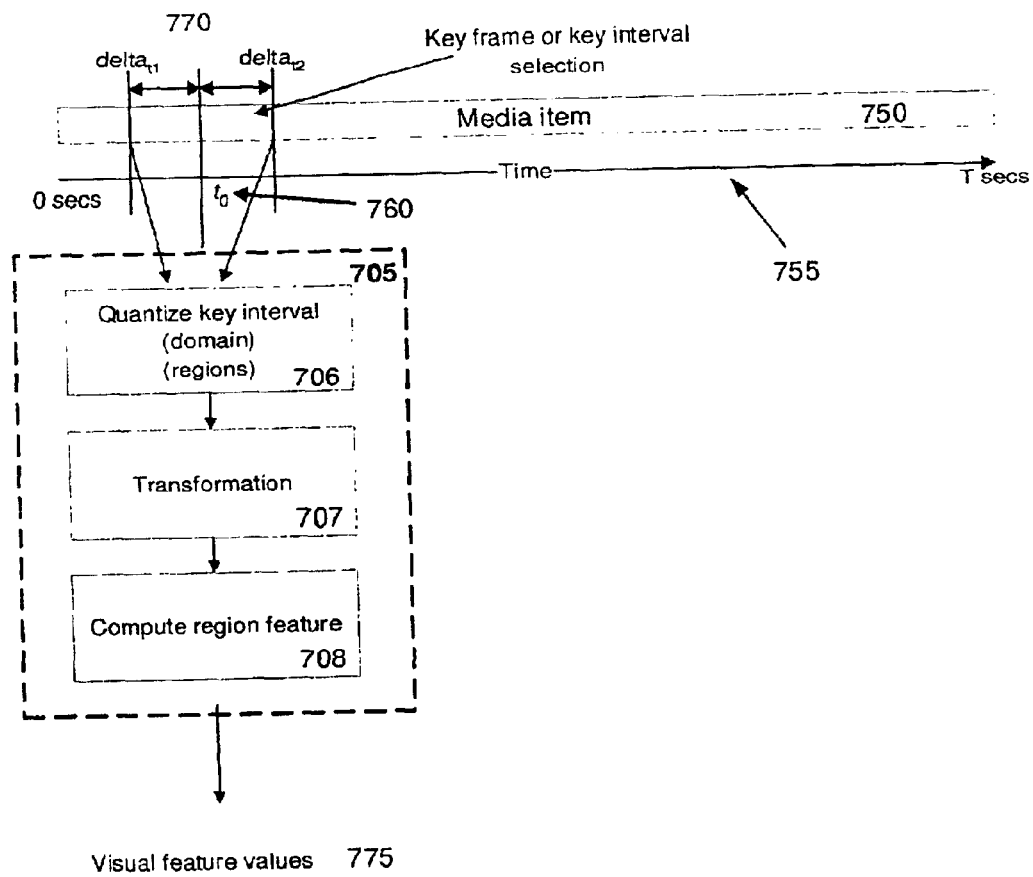
FIG. 7A is a flowchart of the visual feature extraction process for media items, where first media item regions are selected and then the data within the regions is transformed.
Figure 7B:
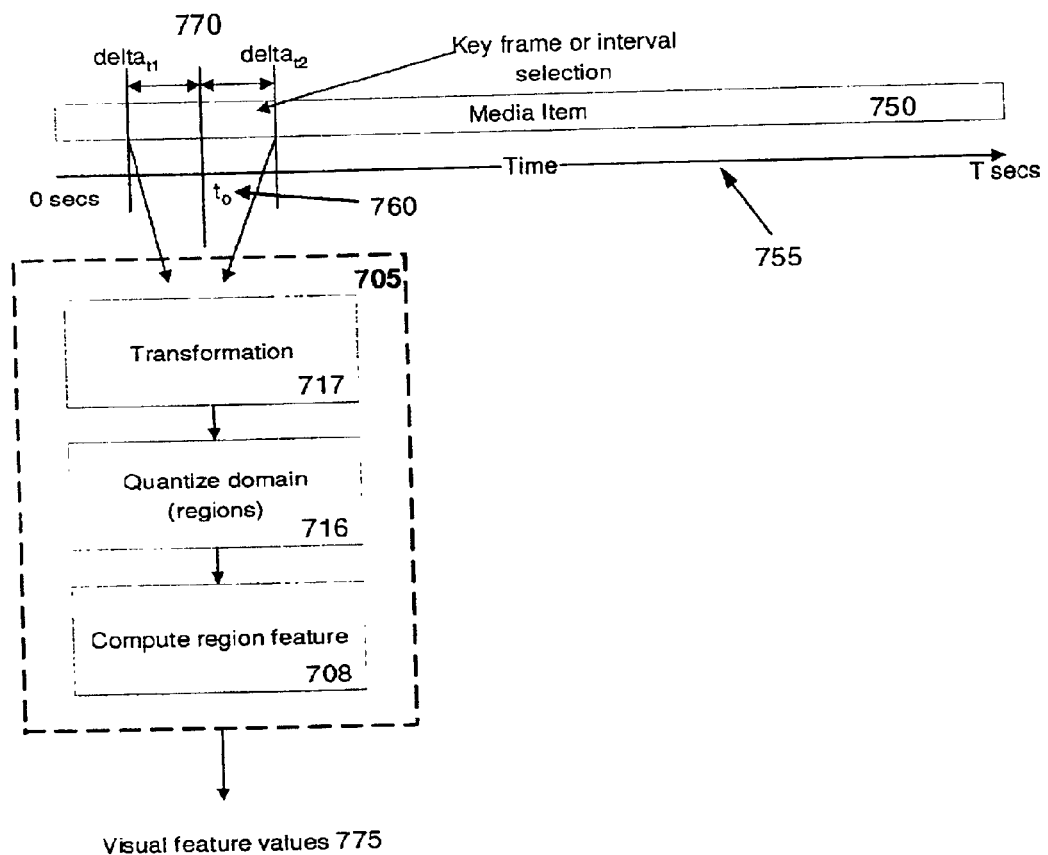
FIG. 7B is a flow chart of a visual feature extraction process for media items, where first the media item is transformed and then regions in the feature domain are selected.

Visual features 775 are computed from key intervals. Two methods for visual feature computation are described in FIGS. 7A and 7B. The media item 750 in this case has a time dimension 755. Characteristic key frames, e.g., a frame a $t_0$ 760, or characteristic key intervals 770 are selected. A key interval could be a window [$\text{delta}_{t1}$, $\text{delta}_{t2}$] around frame a $t_0$ 760. So far, the methods described in FIGS. 7A and 7B are the same. Key intervals 770 or key frames 760 are also selected in the same fashion for both methods. These key frames or intervals could be in the middle of shots, they could be at the beginning and end of shots, or the could be equally spaced over the shots. Alternatively, the key intervals can be selected based on visual properties of the media item, such as, temporal regions of minimal motion or temporal regions of maximal motion.

In FIG. 7A, the visual feature computation 705 proceeds as follows. Given the key frame or key interval 770, this interval is quantized into regions in step 706. In step 707, the data in each region are transformed into a different feature space. (Such a transformation could, for example, be visual flow computation for each region.) Following this, in step 708, region features are computed. (In the visual flow example this could be average flow in a region.) The visual features 775 are output of visual feature computation process 705. In FIG. 7A, the visual feature computation 705 proceeds differently. Now, in step 717 first the data in the key frame or key interval is transformed into a different feature space. (Such a transformation could, for instance, be a Fourier transform.) In step 716, the values of this transformation are regarded as a domain and this domain is quantized into regions. (If the transformation is the Fourier transform, the domain is the frequency spectrum.) For each of the regions in that domain, in step 708, region features are computed. The visual features 775 are output of visual feature computation process 705. The visual features are coarsely quantized into codes (see, for example, FIG. 11B) and these codes are used to populate feature vectors as in FIG. 13.

The feature transformation and feature extraction steps are dependent on the type of similarity to be measured. For example, image color based coding processes have been discussed in Smith et al. There are several other techniques of media transformation and feature computation that are well known in the art. See Smith and Chang, Tools and Techniques for Color Image Retrieval, In IS&T/SPIE Proc Vol. 2670, Storage and Retrieval for Image and Video Databases.

The feature-based vector generation process is applied to all the key intervals selected by the key-framing process. The media item M in FIGS. 7A and B is depicted by a horizontal rectangle 750.

Time running from time 0 to time T seconds is indicated by the time axis 755. A key frame is selected at time is $t_0$ (760) or, alternatively, a key interval (770) is selected between times $delta_{t1}$ and $delta_{t2}$.

In general, the visual feature computation is comprised of a number of steps. The complexity of each of the steps is dependent on the feature being considered. In this invention, for media items we describe in more or less detail two visual features, namely, image color-based codes and optical flow-based codes. As indicated above, this feature code generation process, that generates feature values 775, is comprised of two steps, namely, the step where features are extracted 705 and a quantization or code generation step as in FIG. 13. Each of these steps is discussed below.

Referring again to FIGS. 7A and B, in the feature vector computation step 705, the data in the key intervals are processed to extract different types of measurements or visual features. These measurements may be based on both global and local spatial or spatio-temporal properties of a key interval. These measurements may also be extracted from predetermined portions (regions) of the key intervals.

Figure 8:
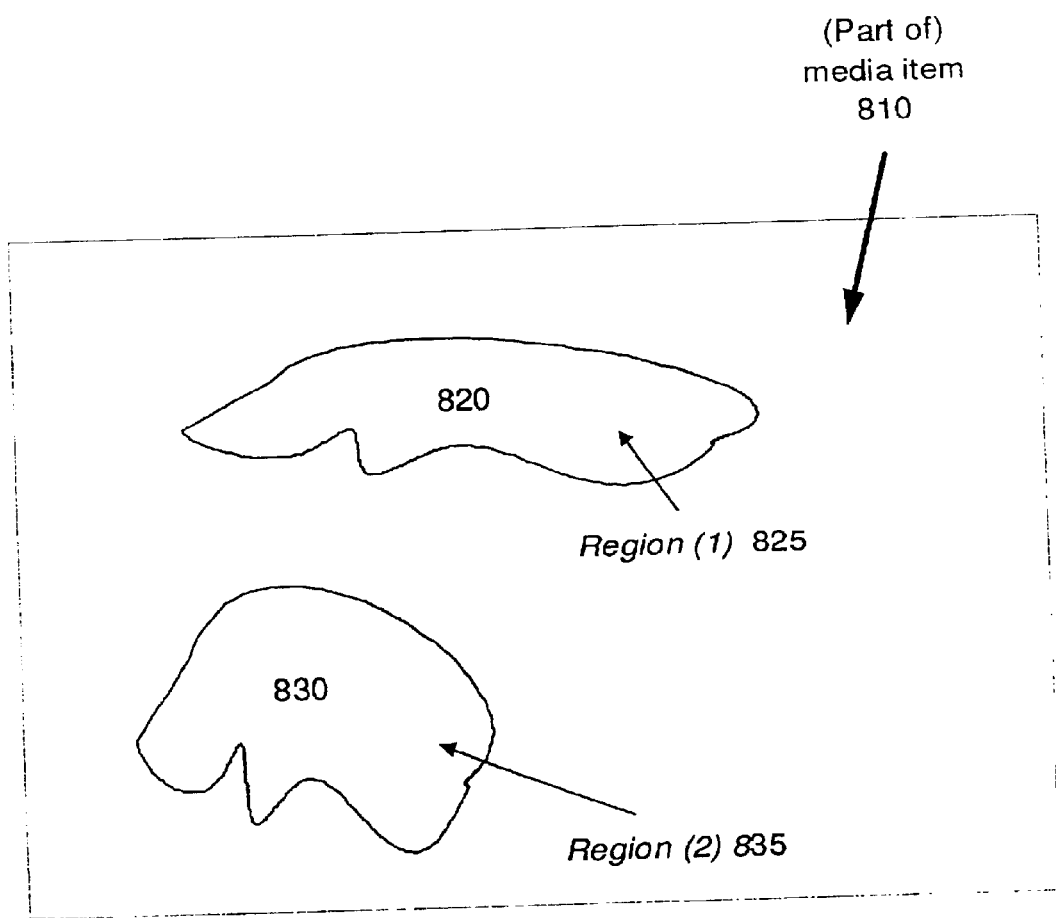
FIG. 8 is a sketch of an media item frame with two arbitrary regions from which the features are computed.

For example, in FIG. 8 a part of a media item 810 (e.g., key interval) is shown with two arbitrary shaped regions, 820 and 830, region (1) and region (2), respectively. Only from the visual data in these regions, the feature values 775 for (say) feature $F_j$ are computed. The regions, 820 . . . 830, here can cover the complete key interval and the regions can differ the features $F_j$, j=1, 2, . . . that are used. Each feature $F_j$ may have different regions $W_j$ and a different number of these local regions.

Figure 9:
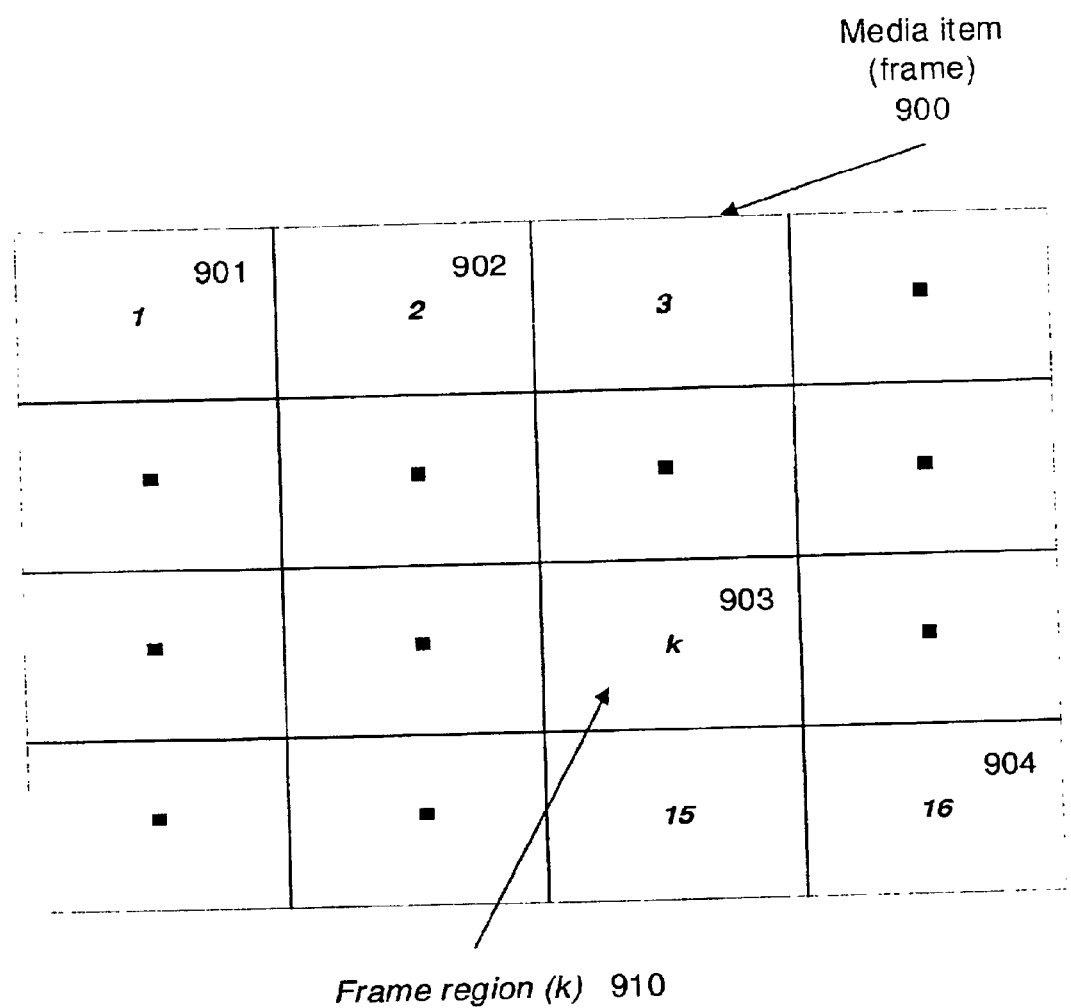
FIG. 9 is a video frame where the regions are rectangular windows (regions).

FIG. 9 shows an example where the media item key frames 900 for feature $F_j$ are divided up into 16 rectangular windows (regions) 901, 902, . . . , 903, . . . , 904 (the local regions). Other windowing schemes are easily contemplated by persons skilled in the art.

Figure 9A:
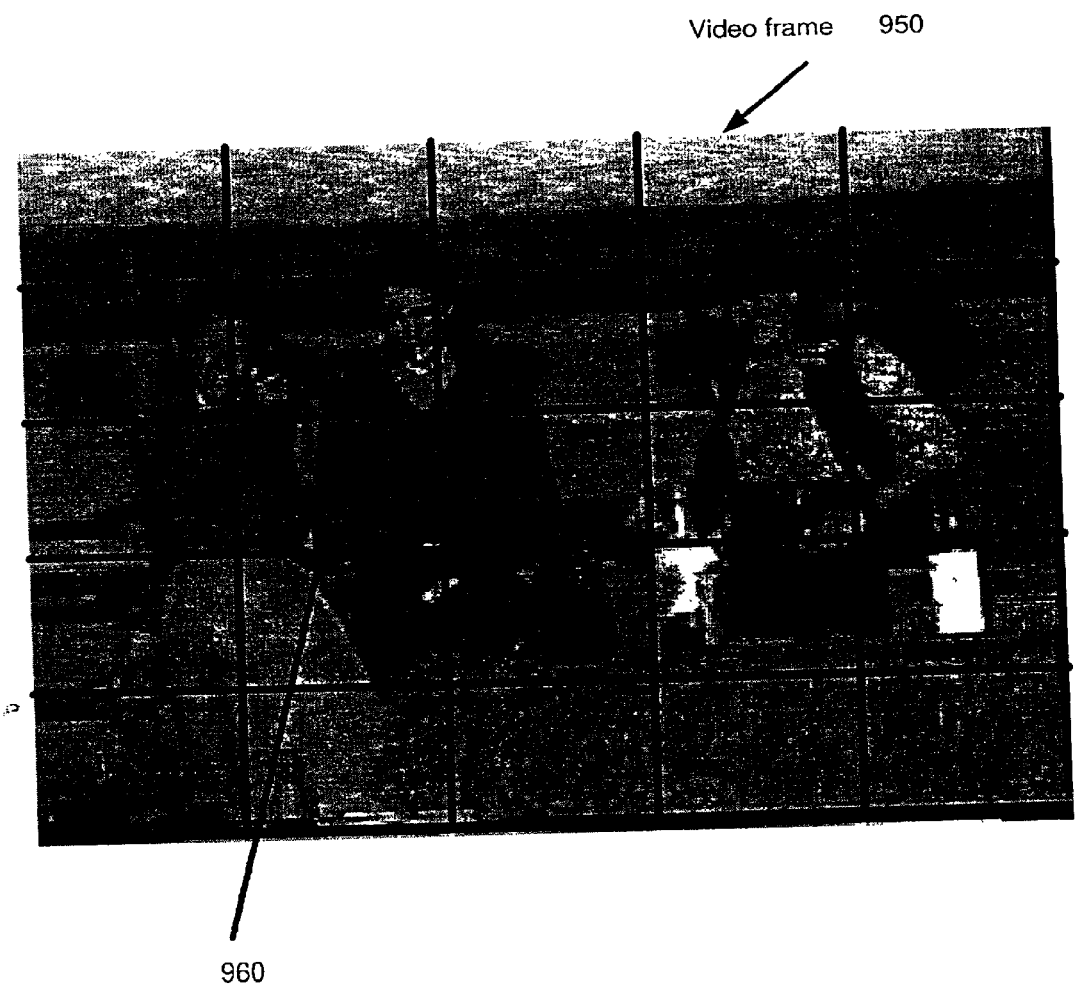
FIG. 9A is an example video frame with rectangular regions that show the data that is used for feature computation.

FIG. 9A gives an example of a video frame 950 (part of the media item) with the window structure 901, 902, . . . , 903, . . . , 904 (as in FIG. 9) overlaid. Each window 960 contains data which is used for visual feature vector computation; the media transformation 705 would use data in the whole frame 950. In the case where the domain regions are windows, with $w_1$ windows horizontally and $w_2$ windows vertically we have $W_j = w_1 \times w_2$ regions. The media item region selection (706) for each visual feature j which has $W_j$ quantized elements. These features are then stored in feature vector 755.

Referring to FIG. 7A, media regions are selected 706 every time $t_0$ (760), i.e., a key interval, is encountered. Each feature $F_j$, j=1, . . . , m is computed from the data in the appropriate regions for the different features $F_j$. The region transformation 707 depicts the transformation of media into feature space, such features can be color space transformation, edge detection, optical flow, etc. In general, the resulting feature values are not directly used as input to the feature range quantization step (715). Rather, an intermediate transform 708 is applied that maps the features obtained by region transformation 707 into a smaller number of feature values for each $F_j$, j=1, . . . , m. An example is to compute the average hue for the regions 901, 902, . . . , 903, . . . , 904 in FIG. 9. Or, it maps a number of high-contrast edge element located in the form of video text into the coordinates of the window that contains the edge elements. In essence, the transformation 708 is a data reduction step so that the vector representations for the media items $S=s_1, \ldots, s_n$ are as sparse as possible and yet the reference streams can still be distinguished.

Referring to FIG. 7B, it is alternatively possible that all the data in the key interval can be transformed through a media item transform 717 into a feature space G. Hence, a mapping 717 is performed of all the data in a key interval into a feature space G. (An example here is a Fourier transform of the data in the key interval, with G one- or two-dimensional frequency spaces.) Then local regions of feature space G (feature regions), obtained through feature region selection 716, are used as input to the region feature computation step 708.

An example of this case is the computation of features from the audio track. The key (time) interval now could be $[delta_{t1}, delta_{t2}]$ (770 in FIG. 7B) and one of the features F can be the Fourier transform of this time interval. This gives the distribution of audio frequencies, from low to high, in the time interval $[delta_{t1}, delta_{t2}]$. Regions in the domain $[0, f_{max})$ of G of the frequency distribution function are used to compute audio features (rather than the domain being the key interval). Here $f_{max}$ is the maximum frequency in the key interval. For instance, one could use a subdivision of $[0, f_{max})$ into equal sub intervals (regions), and the output of transformation 708 (region-based-feature-computation) could be simply the average value or energy in the sub intervals.

Figure 10:
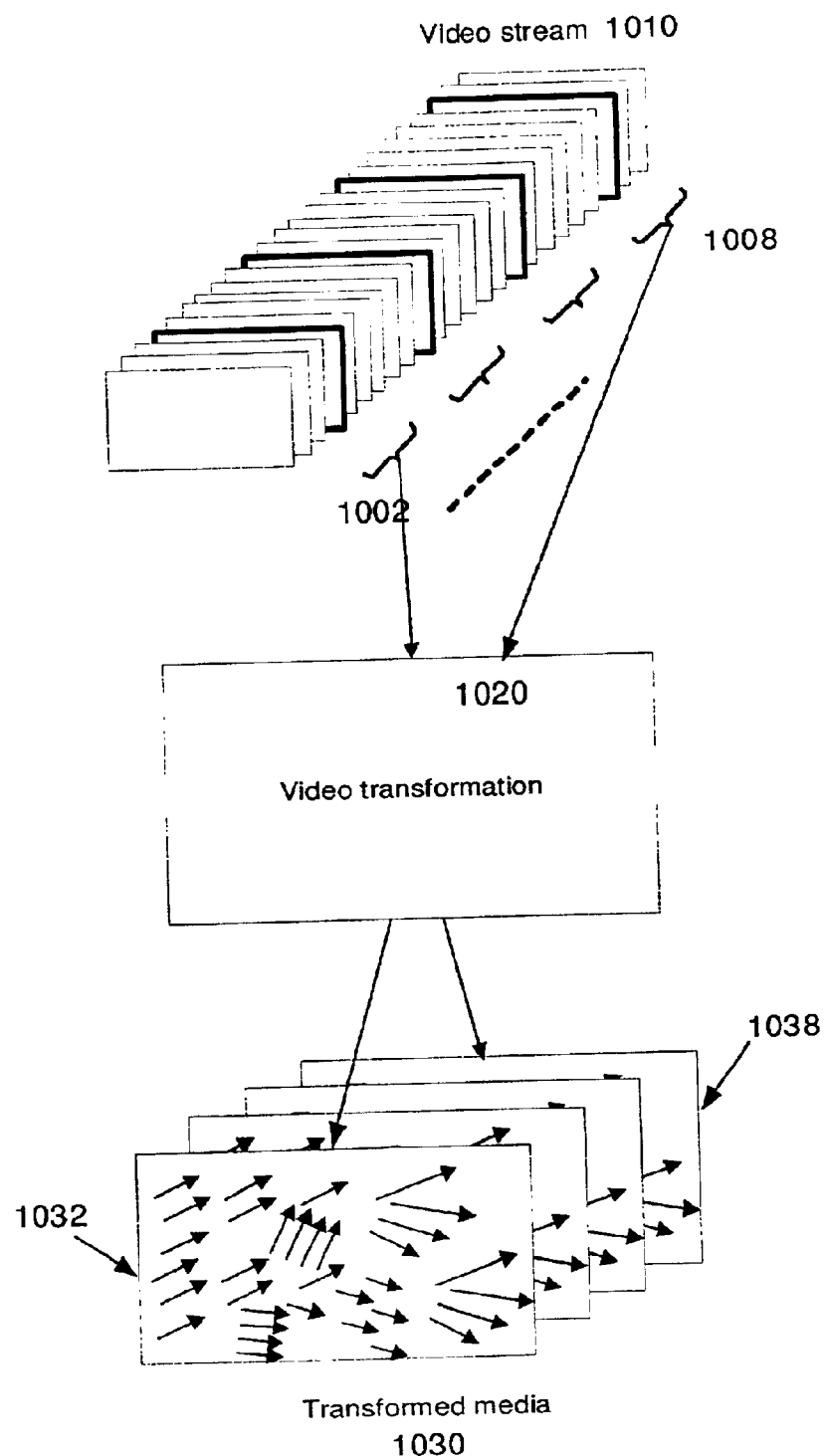
FIG. 10 shows a flow diagram of a video transformation where the regions span one or more frames and the media item visual feature is optical flow.

The visual feature extraction can encompass many different transformations and quantizations. In the case of visual media, it includes, computing the color histogram of a key frame, computing color histogram of selected spatial regions in the key frame, computing the pixel difference between two or more temporally displaced key frames, computing a measure to detect the presence of high-contrast regions in a key frame (like scene-text), or computing the optical flow or other spatial displacements between two subsequent frames (or possible frames spaced further apart) within a key interval. FIG. 10 shows this last case. A video stream 1010 is the input to a video transformation 1020 that computes the optical flow 1030 (transformed media). A possible way to implement this is to select key intervals of frames 1002 . . . 1008 in video stream 1010 as input to the video transformation 1020. Each key interval is transformed into a feature domain which in this case are individual frames 1032 . . . 1038 of optical flow. Every pixel in these frame contains two values, x and y, that together represent the optical flow at the pixel in vector form $(x, y)^t$. The optical flow is computed by comparing and matching two or more consecutive frames in the key intervals. Optical flow computation is well known in the prior art. Besides optical flow, any other transformation that has as domain two or more frames, be it consecutive frames or frames spaced apart, and maps this data into a function on some other domain that can be used as features for categorizing video sequences.

To put it simply, the domain is the data space from which the visual features are computed. The domain can be the video frame itself, which amounts to the red, green and blue channels; or, e.g., luminance. On the other hand, the domain could be the a functional transformation of two or more frames into a different domain, as optical flow between the frames. In that case, the domain is space of optical flow from which the visual features are computed.

Categorization segments of a media item M, is aided by using some color quantization, for example, the following frame color codes. The color space of frames (images) has been extensively used for indexing and searching based on image content. Application of hue color code, a preferred embodiment of this invention, is comprised of a number of steps (see FIG. 11A).

Color is a good feature for video categorization. In particular, the hue component of color contains much information. Hue is the portion of color information that indicates which color a particular pixel in frame 1110 has. The colors range from red, green to magenta (see FIG. 11B.) Hence, from the video signal, which is as input to the system is typically in an RGB or YIQ format, the hue component has to be extracted. This requires a transformation from the original color space (RGB or YIQ) of the media item to the HSV color space. This is achieved by using the standard algorithms 1115 for color space conversions (e.g., Foley & van Dam, Chapter 13). Once the image is transformed in to the HSV model, the hue channel is separated from the HSV model, as the code generation is based on the hue values of the pixels in the key frames.

Figure 11A:
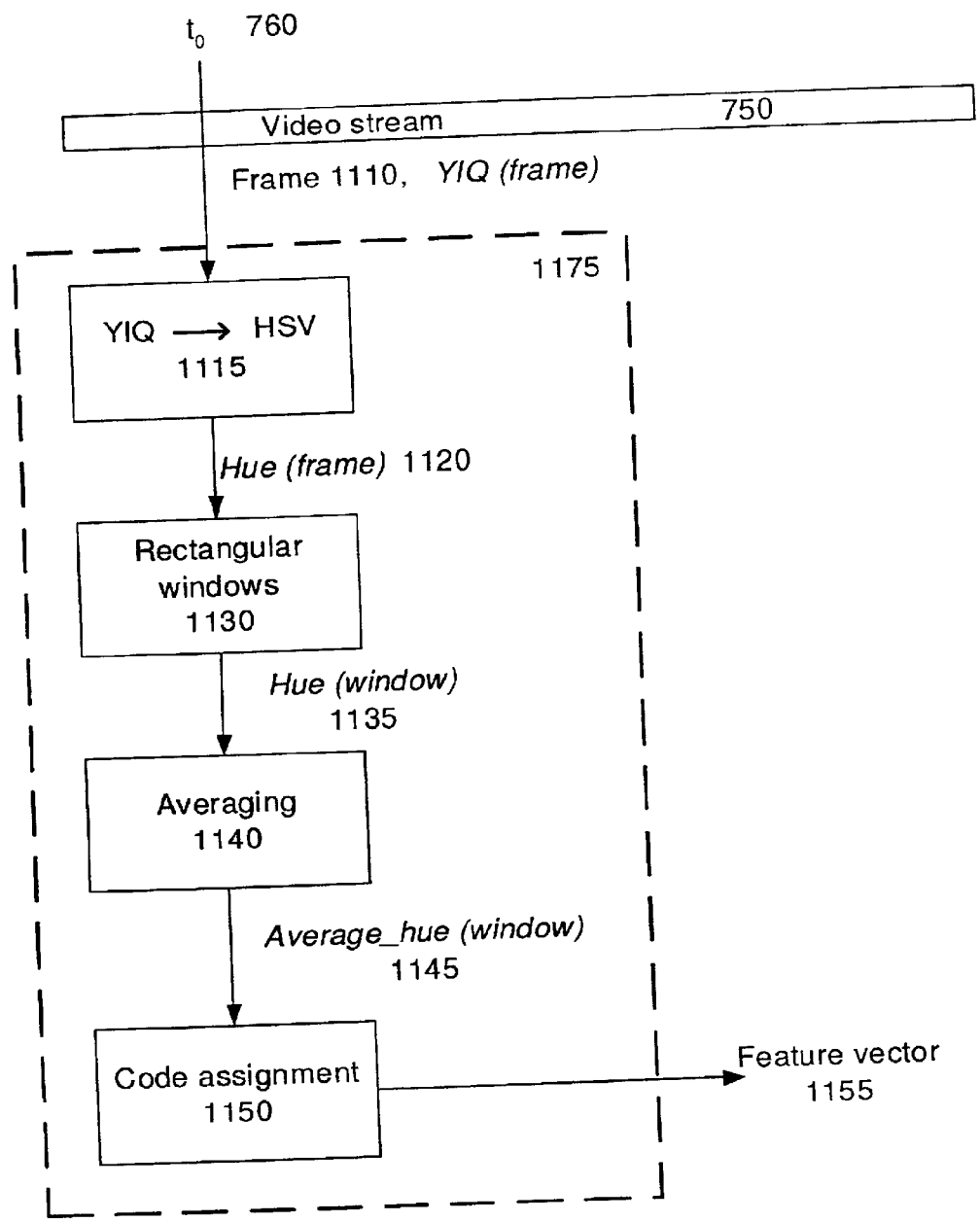
FIG. 11A is an example flow diagram of visual hue feature computation for a key frame with rectangular windows.

Refer now to the block diagram of FIG. 11A. Let media item 750 be the input and frame 1110 at time $t_0$ 760 be the current key frame. This frame 1110 could be in YIQ format and is denoted as YIQ(frame) in FIG. 11A. Then in block 1175 the feature (hue) vectors 1155 for this frame are computed. The regions for the frame are rectangular windows 1130. The output of process 1175 therefore is a vector $F=(f_{11}, f_{12}, \ldots, f_{1n}, f_{i1}, f_{i2}, \ldots, f_{in}, f_{N1}, f_{N2}, \ldots, f_N)$ with N the number of windows and n the number of color tokens per window.

The first step in 1175 of FIG. 11A, is to convert the the YIQ encoded frame into an HSV encoded frame 1115. This is well known in the prior art. The output then of 1115 is the hue part of the color information of the frame, denoted as Hue(frame) 1120. In FIG. 8A the frame is divided up into windows 1130. (Note that these need not be rectangular, they can be arbitrarily shaped as show in FIGS. 8 & 8A. Rectangles are a specific case of an arbitrary shaped window.) Block 1130 outputs Hue(window) 1135 for each window 901, 902, . . . , 903, . . . , 904 in the current frame. Subsequently, block 1140 determines the average hue, Average_hue(window), in the windows. The averaging is the first data reduction step. (Note that other averaging methods are contemplated. For example in one embodiment, the median of the window instead of the average is used and it is more robust to noise.) The second data reduction step in 1175, is block 1150 which quantizes Average_hue(window) into a small number of quantization levels per window and assigns codes to each quantization level. The mechanics of this quantization and code assignment is explained in FIG. 11B. As noted above, the output of step 1175 is a feature vector $F=(f_{11}, f_{12}, \ldots, f_{1n}, f_{i1}, f_{i2}, \ldots, f_{in}, f_{N1}, f_{N2}, \ldots, f_{No})$ 1155.

There are a number of different ways of extracting feature values Average_hue(window) 1145. For example, at one extreme case the hue value at each pixel can be considered as a feature (i.e., the windows are the pixels) or at the other extreme the hue value of all the pixels in the frame can be averaged to generate the feature value (i.e., the window is the frame). In a preferred embodiment, as indicated above, the frame is divided into $w_1$ windows in one dimension of the image and $w_2$ windows along the other dimension as in FIG. 9. An average hue value is computed based on the pixels in each window. Thus the hue color for a video key frame is a set of $w_1 \times w_2$ average hue values. Quantized these give a feature vector C for each frame.

Figure 11B:
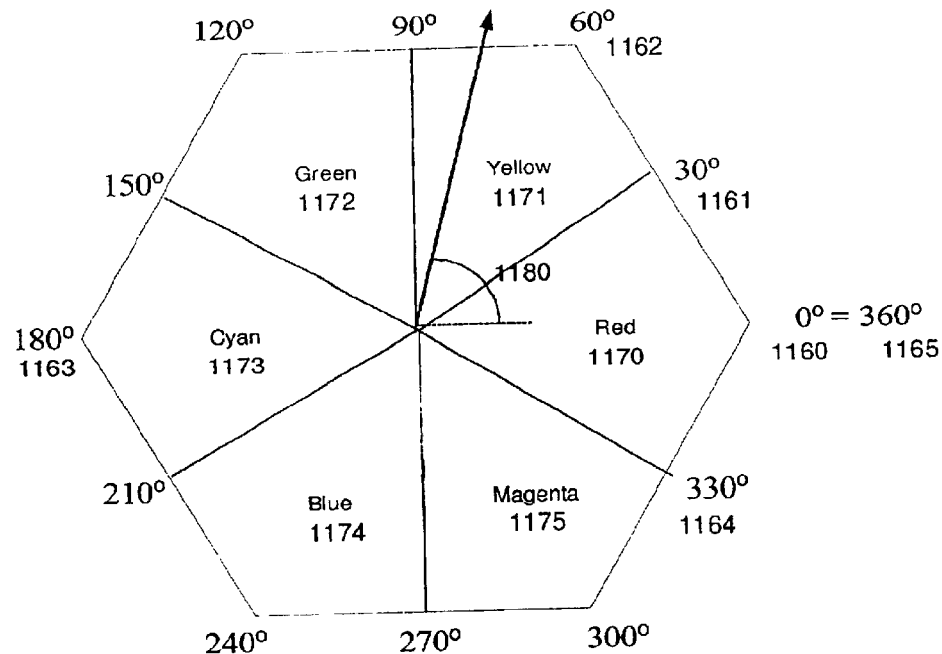
FIG. 11B gives an example quantization of hue space to define visual hue codes.

In FIG. 11B, 1180 is the hue value of a pixel. The hue values can range from 0 degrees to 360 degrees, in FIG. 11B indicated by 1160 (0 degrees), 1161 (30 degrees), 1162 (60 degrees), . . . , 1163 (180 degrees), . . . , 1164 (330 degrees), 1165 (360 degrees). The hue values from 330 degrees (1164) through 30 degrees (1161) are centered around the color pure red (1170), from 30 degrees (1161) through 90 degrees around the color pure yellow (1171) etc. To arrive at hue feature vectors 1155, the hue value outputs of the averaging operation 1140 need to be coarsely quantized. This quantization, and code assignment, to obtain feature vectors 1155 is performed in step 1150. FIG. 11B gives a possible hue quantization, code assignment, table 1180. Coding could be performed according to the following table

| Color range | Code | Color | Number in Figure |
|---|---|---|---|
| 330 < Average_hue (window) <= 30 | 0 | Red | 1170 |
| 30 < Average_hue (window) <= 90 | 1 | Yellow | 1171 |
| 90 < Average_hue (window) <= 150 | 2 | Green | 1172 |
| 150 < Average_hue (window) <= 210 | 3 | Cyan | 1173 |
| 210 < Average_hue (window) <= 270 | 4 | Blue | 1174 |
| 270 < Average_hue (window) <= 330 | 5 | Magenta | 1175 |

There are several different ways in which a feature can be quantized. The choice of quantization can affect the categorization processes.

The feature-based code generation steps discussed above have been separated out as steps for clarity of presentation. However, these steps are combined to minimize the computation required to generate these feature vectors.

The feature vector extraction and coding process described above is one specific method of generating the feature vectors. Depending on the kind of similarity metric being used, the feature extraction and coding process can be significantly different. The vector representation mechanism and its efficiency in performing media item categorization are not significantly affected by the coding scheme itself. For example, one possible metric of similarity is the motion similarity of image sequences, that is, here video sequences are compared based on flow rather than color. Such a coding and similarity measurement scheme can be used within the frame work proposed in this invention (see R. Mohan, "Video Sequence Matching", cited above).

Figure 12:
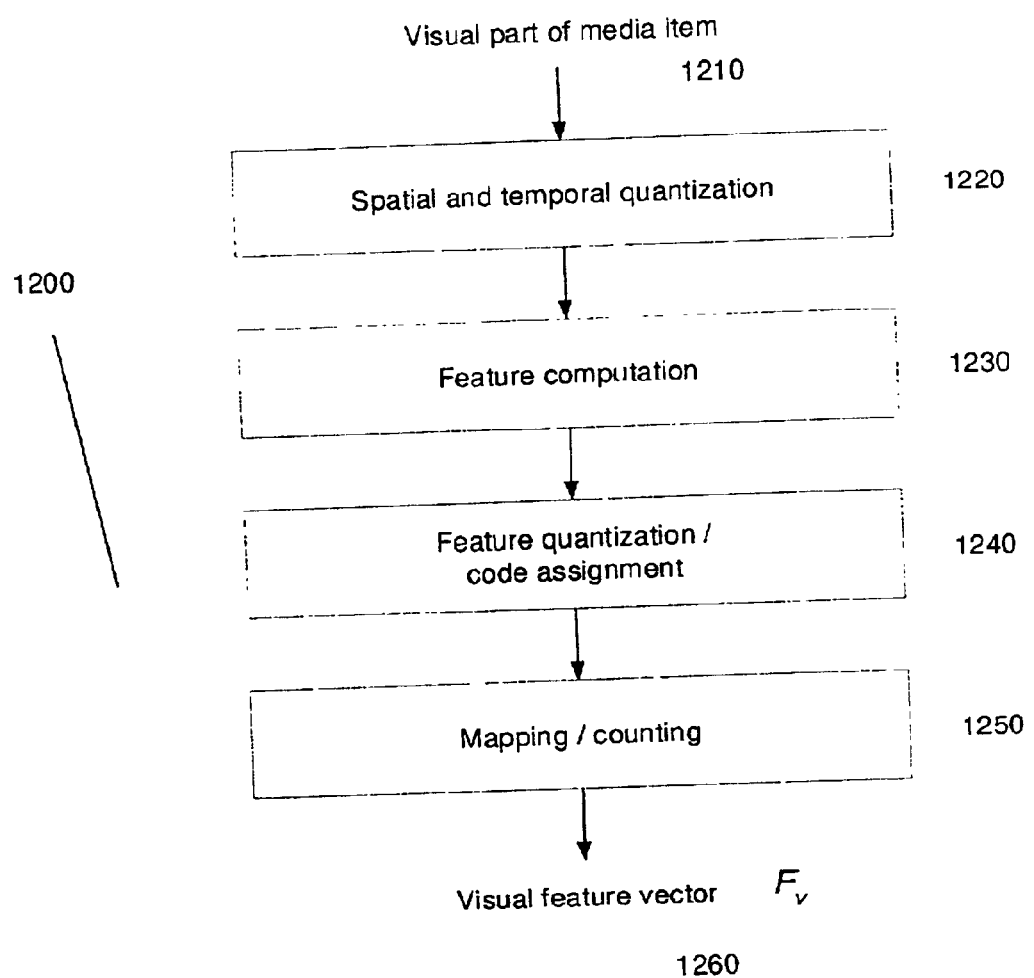
FIG. 12 is a flowchart of the visual feature vector computation from the visual part of the media item.

FIG. 12 is a flowchart 1200 of the process of the visual feature vector computation from the visual part of the media item. Input to this process is the visual part of the media item 1210. Following this step is the spatial and temporal quantization 1220 of the visual part in the media item. The temporal quantization is the process of selecting key frames or key intervals as in FIGS. 7A and 7B. The spatial quantization is the process described in FIGS. 8 and 9. From this spatio-temporally (both in image/frame space and in time) quantized visual data, features are computed 1230, such as flow as in FIG. 10 and hue as in FIG. 11. In step 1240, these feature values are coarsely quantized 1240 into a small number of discrete values, or codes (e.g., the quantization 1180 of the hue values in FIG. 11B). A process of mapping or counting 1250 (described in FIG. 13) derives a visual feature vector, $F_v$, 1260.

Figure 13:
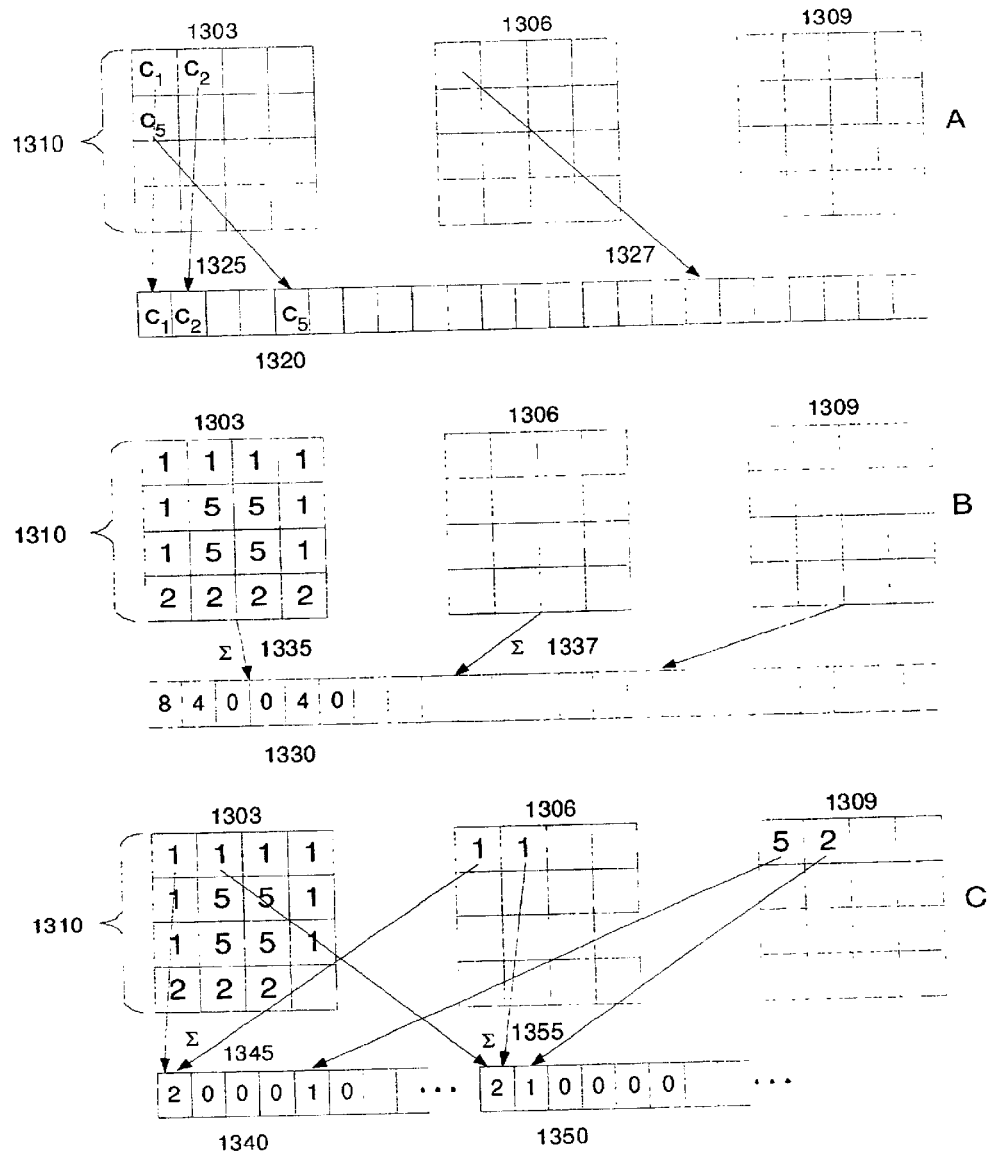
FIG. 13A shows a method for computing visual feature vectors from the visual part of the media item where both temporal and spatial properties of the media item are preserved.
FIG. 13B shows a method for computing visual feature vectors from the visual part of the media item where only the temporal properties of the media item are preserved.
FIG. 13C shows a method for computing visual feature vectors from the visual part of the media item where only the spatial properties of the media item are preserved.
FIG. 13D shows a preferred specific method for computing visual feature vectors from the visual part of the media item where the key intervals of the media item are ordered based on one or more features of the key intervals.

Moving on to FIG. 13, here three possible methods for constructing visual feature vectors $F_v$ are given. The visual part of the media item 1310 consists in this figure of key frames or key intervals 1303, 1306, and 1309. Let N be the number of key frames or key intervals, W the number of windows (regions) per key frame/interval, and C the number of codes for a visual feature.

A first method to determine a visual feature vector is given in FIG. 13A. The visual feature vector 1320 here is determined by a mappings 1325, 1327 from quantized feature values $c_1$, $c_2$, $c_3$ of key intervals to the feature vector 1320. The coded feature values $c_1$, $c_2$, $c_3$ are mapped 1325 to entries of the visual feature vector 1320. In that case, for a specific feature, the visual feature vector will be of length W×N, where W is the number of regions per key interval and N is the number of key intervals. Alternatively, the codes $c_1$, $c_2$, $c_3$ could represent the absence 'c=0' or presence 'c=1' of a certain feature; or, the codes $c_1$, $c_2$, $c_3$ could represent the absence 'c=0' or the amount of presence 'c=x', with $1 \leq x \leq C$ where C is some upper bound. An example of the former could be the color feature red, an example of the latter could be a visual motion feature. Note that the length of the visual feature vector $F_v$ depends on the number of key intervals N, the number of regions W, and the number of codes C. That is, the length is N×W. Both spatial and temporal information about the key interval is preserved in the visual feature vector $F_v$.

A second method to determine a visual feature vector is given in FIG. 13B. The visual feature vector 1330 here is determined by a counting 1335, 1337 the occurrences of feature code values in the key intervals. Key interval 1303 has codes c=1, 2, ..., 6 (in this case the number of codes C is 6) associated with each of the spatial regions. The first 6 elements of the visual feature vector $F_v$ 1330 are determined by counting the codes in the first key interval 1303. Code 1 is associated with 8 spatial regions, hence $F_v(1)=8$, code 2 is associated with 4 spatial regions, hence $F_v(2)=4$, and so forth. The next 6 elements of the visual feature vector $F_v$ 1330 are determined by counting 1337 the codes in the second key interval 1306. This process is repeated for all key intervals and all visual features. Note that again the length of the visual feature vector $F_v$ depends on the number of key intervals N but not on the number regions W. In particular, the length of the visual feature vector is N×C. Also note that the information of the spatial arrangement of the codes in the key intervals is lost.

A third method to determine a visual feature vector is given in FIG. 13C. The visual feature vector 1340 ... 1350 here is again determined by a counting 1345, 1355 the occurrences of feature code values in the key intervals 1303, 1306, 1309, .... In this case, the counting 1345, 1355 is performed by determining the number of times a code occurs over corresponding regions in the key intervals. The first part 1340 of the visual feature vector $F_v$ is determined by the first region W(1,1) (the upper-left window) of the key intervals. The first element of the visual feature vector is the number of times that c=1 appears in the regions W(1,1), in this case 2 times. The second element of the visual feature vector is the number of times that c=2 appears in the regions W(1,1), in this case 0 times. This counting is done for all feature codes c=1, ..., C, where C is the largest code number. The second part 1350 of the visual feature vector $F_v$ is determined by the regions W(1,2) (second region in first row) of the key intervals. The first element of this part 1350 of the visual feature vector is the number of times that c=1 appears in W(1,2), in this case 2 times. The second element of the visual feature vector is the number of times that c=2 appears in W(1,2), in this case 1 times. This counting is done for all feature codes c=1, ..., C, where C is the largest code number. Note that the length of the visual feature vector for this particular visual feature is now equal to W×C. Also note that for this type of feature code occurrence counting the temporal information is lost.

The methods in FIGS. 13A and 13B preserve temporal information and, therefore, the length of vector $F_v$ depends on N. For the method in FIG. 13C, the length of vector $F_v$ does not depend on N but the spatial information is lost. It is desirable that the length of vector $F_v$ does not depend on N; that the temporal information is discarded; and, that the spatial information is maintained.

Figure 13D:
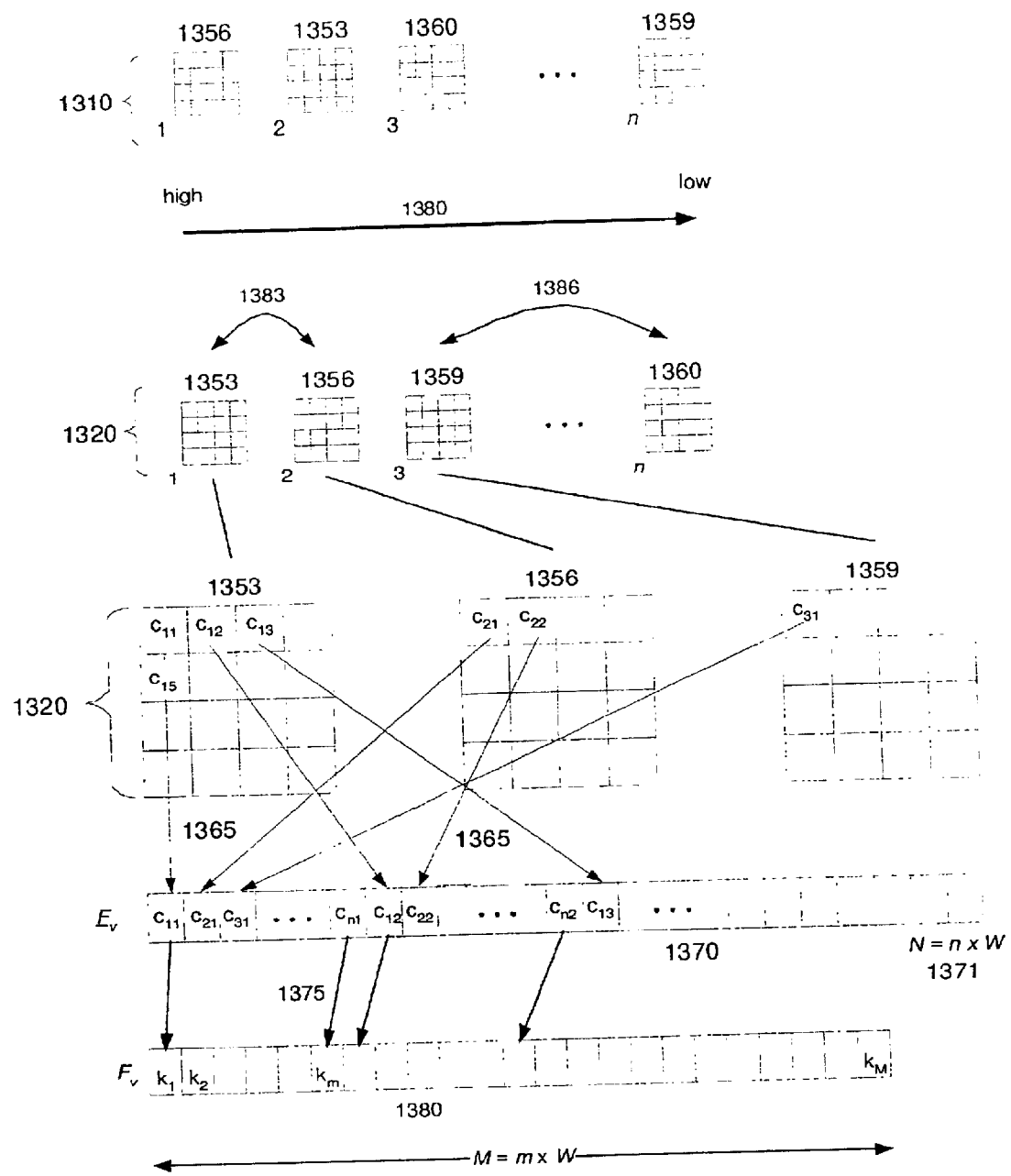

FIG. 13D shows a preferred specific methods for determining a visual feature vectors $F_v$ from the visual part of the media item 1310. The key frames or key intervals 1356, 1353, 1360, ..., 1359 are selected from a media item. However, by rearranging these key frames or intervals, 1383, 1386, etc., these key frames or intervals are ordered into a new sequence 1320 of key intervals 1353, 1356, 1359, ..., 1360 according to the value of visual feature that is to be encoded in the visual feature vector $F_v$. For example, the visual feature of average frame brightness can be ordered from high to low in the sequence 1320. Or, the visual feature of average optical flow in key intervals can be ordered from high to low in 1320. The effect and purpose of this ordering is that the temporal information in the video stream is discarded. (This is analogous to discarding word location information in using word frequency vectors, e.g., $F_t$, in text document analysis.) The visual feature value codes (quantized feature values) in the regions of the key frames or intervals are then mapped 1365 into a first visual feature vector $\underline{F}_v$ 1370. Assume that there are n key frames or intervals in media item 1310 with W regions per key frame this gives a feature vector $\underline{F}_v$ 1370 of length N=n×W. So we have the first ordered key frame or interval 1353 through the n-th ordered key frame or interval 1360. Code $c_{11}$ in region W(1,1) of the first key interval 1353 is mapped to the first element of $\underline{F}_v$ 1370, code $c_{21}$ in region W(1,1) of the second key interval 1356 is mapped to the second element of $\underline{F}_v$ 1370, code $C_{31}$ in region W(1,1) of the third key interval 1359 is mapped to the third element of $\underline{F}_v$ 1370, and code $c_{n1}$ in region W(1,1) of the n-th region 1360 is mapped to the n-th element of $\underline{F}_v$ 1370. Then, code $c_{12}$ in region W(1,2) of the first key interval 1353 is mapped to the (n+1)-th element of $\underline{F}_v$ 1370, code $c_{22}$ in region W(1,2) of the second key interval 1356 is mapped to the (n+2)-th element of $\underline{F}_v$ 1370, code $c_{32}$ in region W(1,2) of the third key interval 1359 is mapped to the (n+3)-th element of $\underline{F}_v$ 1370, and code $c_{N2}$ in region W(1,2) of the n-th key interval 1360 is mapped to the 2n-th element of $\underline{F}_v$ 1370. This process is repeated till all codes in all key intervals are mapped into vector $\underline{F}_v$ 1370. Note that the length 1367 of the resulting visual feature vector 1370 $\underline{F}_v$ is N=n×W (1371). This process is further described in FIG. 14A.

The last step in FIG. 13D is to map 1375 visual feature vector 1370 $\underline{F}_v$ to a fixed-length visual feature vector $F_v$ 1380. The length of this vector is M, $F_v=(k_1, k_2, \ldots, k_M)$. We require here that M=$m_s$×W<N=n×W.

There two preferred methods to achieve this, sub sampling vector $\underline{F}_v$ and averaging components of $\underline{F}_v$. These are described below and as process 1440 and process 1470 of FIG. 14B, respectively. For sub sampling $m_s=m_c$, for averaging, $m_s=m_f$.

A first method is sub-sampling $\underline{F}_v$. Let $m_c=\lceil N/M \rceil$, the ceiling of N divided by M, the sampling factor of vector $\underline{F}_v$ to obtain $F_v$. The constant M should be an integer multiple of W let m=M/W. Sub sampling this vector $\underline{F}_v$ is achieved as follows. Let $\underline{F}_v=(\underline{R}(1), \underline{R}(2), \ldots, \underline{R}(W))$, where each $\ldots$, $\underline{R}(W))$, where each $\underline{R}(i)$, i=1, $\ldots$, W, $\underline{R}(i)=(\underline{r}(i,1), \underline{r}(i,2), \underline{r}(i,3), \ldots, \underline{r}(i, n))$ of length n represents a key interval region W(i). Then $\underline{F}_{5,v}=(\underline{r}(1,1), \underline{r}(1,2), \ldots, \underline{r}(1,n), \ldots, \underline{r}(i,l), \underline{r}(i,n), \underline{r}(W,1), \ldots, \underline{r}(W,n))$. The vector $F_v$ is then $(R(1), R(2), \ldots, R(W))$, where each $R(i)$ is obtained by sub-sampling $\underline{R}(i)$. That is, $R(i)=(r(i,1), r(i, 1+m_c), \ldots, r(i, m))$. This is further explained as process 1440 in FIG. 14B.

Figure 14A:
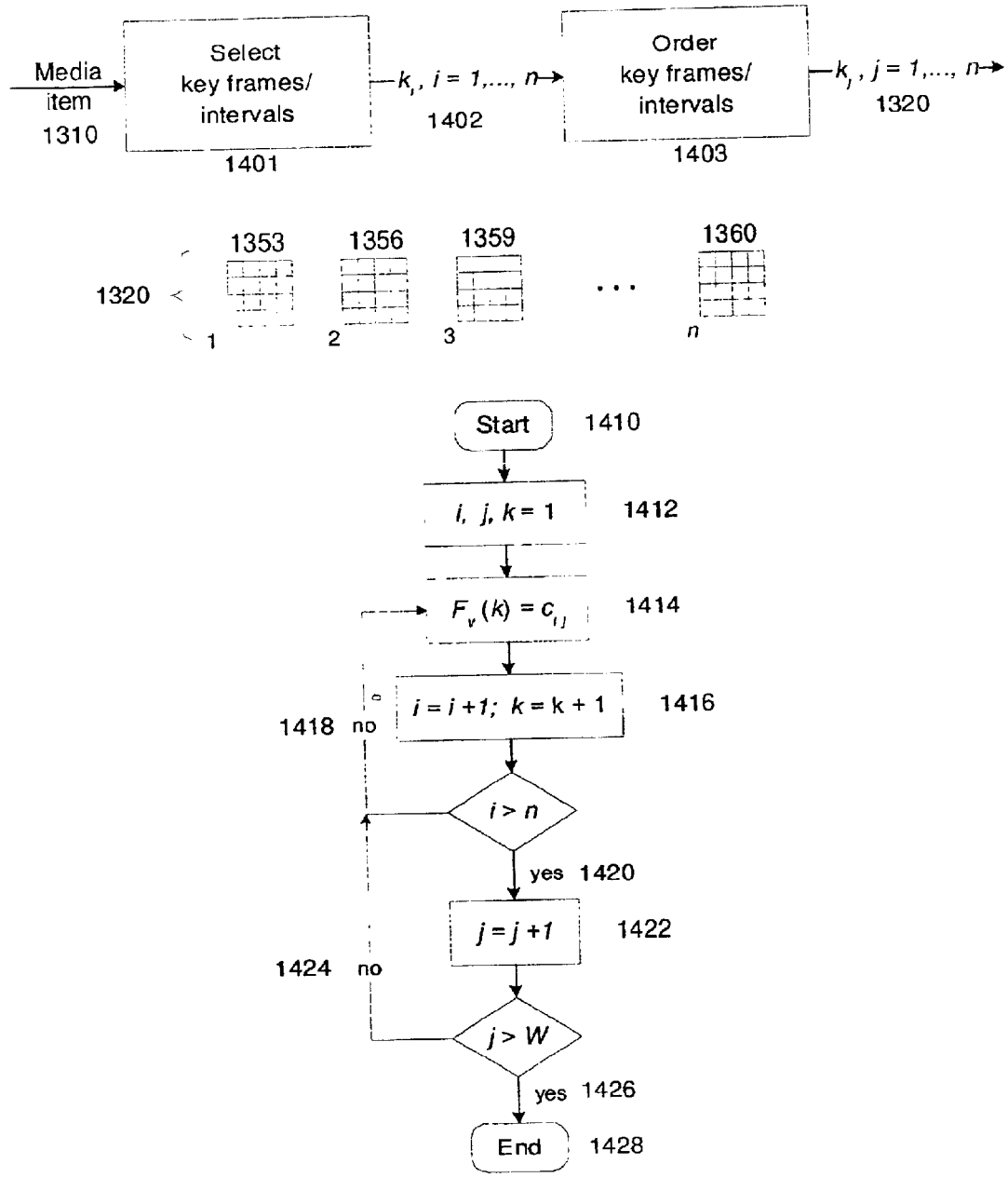
FIG. 14A is a flowchart of the process for computing a first visual feature vector in FIG. 13D.
Figure 14B:
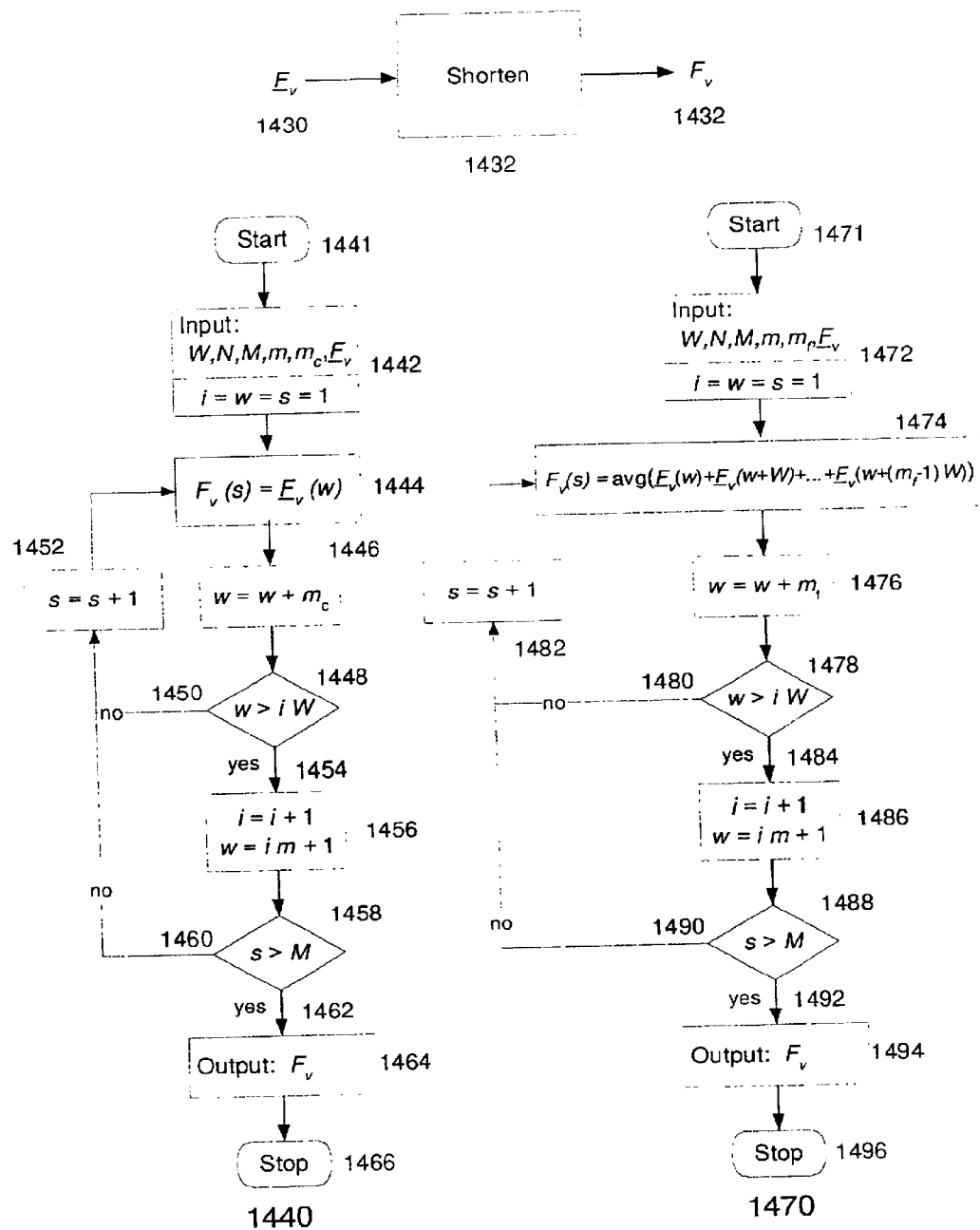
FIG. 14B is a flowchart of the process of shortening the first visual feature vector to a standard length vector in FIG. 13D.

A second method to shorten $\underline{F}_v$ is to average components in $\underline{F}_v$ vector to obtain a vector $F_v$ of fixed length M. Let $m_f=\lfloor N/M \rfloor$, the floor of N divided by M, the number of components of vector $\underline{F}_v$ to obtain $F_v$. The constant M is again an integer multiple of W, let m=M/W. Again, $\underline{F}_v=(\underline{R}(1), \underline{R}(2), \ldots, \underline{R}(W))$, with each $\underline{R}(i)$, i=1, $\ldots$, W, representing a region in a key interval. That is, $\underline{R}(1)$ represents the first region W(1,1), also denoted as W(1), an so on. The vector components of $\underline{F}_v$ are $\underline{R}(i)=(\underline{r}(i, 1), \underline{r}(i, 2), r(i, 3), \ldots, \underline{r}(i, n))$ of length n represent a region W(i) of the key intervals. Let the shortened vector $F_v=(R(1), R(2), \ldots, R(W))$, with $R(i)=(r(i,1), r(i, 2), r(i, 3), \ldots, r(i, m))$. Then each vector $R(i)$ is mapped into a corresponding shorter vector $R(i)$ as:

$$R(i)=(r(i,1), \ldots, r(i, m));$$

with $r(i,j)=\text{avg}[\underline{r}(i, (j-1)m_f+1), \underline{r}(i, (j-1)m_f+m)]$, This shortening of the vector $\underline{F}_v$ to the vector $F_v$ is described in the flowchart process 1470 of FIG. 14B.

In FIG. 14A, is a flowchart of the process for computing the first visual feature vector $\underline{F}_v$ 1370 from the media item 1310 is shown. Input to this process is media item 1310 and in step 1401, key frames or key intervals are selected. (This process is described in FIGS. 7A and B.) The output is a set of key intervals labeled $k_j$, i=1, $\ldots$, n (1402). The number of key intervals n depends on the length of the media item. Process 1403 sorts these key intervals based on a visual property. As noted above, the visual feature of average frame brightness can be ordered from high to low 1380. Or, the visual feature of average optical flow in key intervals can be ordered from high to low 1380. The effect and purpose of this ordering is tat the temporal information in the video stream is discarded. (This is analogous to discarding word location information in using word frequency vectors, e.g., $F_t$, in text document analysis.) The output 1320 of process 1403 is a set of key intervals labeled $k_j$, j=1, $\ldots$, n (1320). This is the set of n key intervals, 1353, 1356, 1359, $\ldots$, 1360 of FIG. 13D. The process, then, of populating the first visual feature $\underline{F}_v$ 1370 with the elements $c_{ij}$ of the ordered key intervals 1353, 1356, 1359, $\ldots$ starts at step 1410. First, in step 1412, the pointers i, j, k, are set to 1 i=j=k=1. In step 1414, $\underline{F}_v$ (k) is set to $c_{ij}$. Subsequently, both i and k are incremented in 1416. The next step is to check if i>n, if not 1418, the next element of $\underline{F}_v$ (k) is set to the element $c_{ij}$ of the next key interval. If i>n 1420, j is incremented 1422, meaning that the next window of the key intervals will be handled. A test is performed first to determine if j>W. If not 1424, on the other hand, the $c_{ij}$ of the next window are entered into visual feature vector $\underline{F}_v$. if yes 1426, this means that all window visual feature vectors are entered into $\underline{F}_v$ and the process ends 1428.

The flowcharts in FIG. 14B describe two shortening processes 4132 of the vector $\underline{F}_v$ 1430 to the vector $F_v$ 1434. Two processes for shortening the vector $\underline{F}_v$ 1430 are described in this figure, the process of sub sampling $\underline{F}_v$ 1440 (on the left) and the process of averaging $\underline{F}_v$ 1470 (on the right).

The process 1440 starts at step 1441. In step 1442, the variables W (the number of regions per key interval), N (length of $F_v$), M (length of $F_v$), $m_c=\lceil N/M \rceil$ (the sub sample rate), m=M/W, and the vector $\underline{F}_v$ are input to the system. Additionally, the variables i, w, s are set to one, i=w=s=1. In step 1444, $F_v$ (s) is set to $\underline{F}_v$ (w), i.e., a component of the short visual feature vector is set to a component of the longer visual feature vector, which results in sub sampling of the key intervals of $\underline{F}_v$. Step 1446 increments the variable w by $m_c$. In test 1448, it is checked whether w>i W, i.e., if a complete key interval has been sub sampled. If not 1450, the variable s is incremented in by 1 in step 1452 and step 1444 is repeated. If yes 1454, in step 1456 i is incremented by 1 and w is set to i m+1. This w is the next component of $\underline{F}_v$ to sub sample. A further test 1458, determines if s>M. If no 1460, the vector $F_v$ (of length M) is not completely filled yet and s is set to s+1 in step 1452 and the process is repeated starting with step 1444. If test 1458 is true, on the other hand, the vector $F_v$ of fixed length M is output in step 1464 and the sub sampling process stops in 1466.

The process 1470 starts at step 1471. In step 1472, the variables W (the number of regions per key interval), N (length of $F_v$), M (length of $F_v$), $m_f=\lfloor N/M \rfloor$ (the averaging rate), m=M/W, and the vector $\underline{F}_v$ are input to the system. Additionally, the variables i, w, s are set to one, i=w=s=1. In step 1444, $F_v$ (s) is set to the average of the $m_f$ component of $\underline{F}_v$, $\underline{F}_v(w), \underline{F}_v(w+W), \underline{F}_v(w+2W), \ldots, \underline{F}_v(w+m_f-1)W)$, i.e., a component of the short visual feature vector is set to the average of corresponding $m_f$ component of the longer visual feature vector $\underline{F}_v$. That is, $$F_v(s)=[\underline{F}_v(w)+\underline{F}_v(w+W)+\underline{F}_v(w+2W)+ \ldots +\underline{F}_v(w+(m_f-1)W)]/m_f$$

Step 1476 increments the variable w by $m_f$. In test 1478, it is checked whether w>i W, i.e., if a complete key interval has been handled. If not 1480, the variable s is incremented in by 1 in 1482 and the averaging step 1474 is repeated. If yes 1484, in step 1486 i is incremented by 1 and w is set to i m+1. This w is the right component of $\underline{F}_v$ to proceed with further filling of $F_v$ by averaging. A further test 1488, determines if s>M. If no 1460, the vector $F_v$ (of length M) is not completely filled yet and s is set to s+1 in step 1482 and the process is repeated starting with step 1474. If test 1488 is true, on the other hand, the vector $F_v$ of fixed length M is output in step 1494 and the averaging process stops in 1496.

Figure 15:
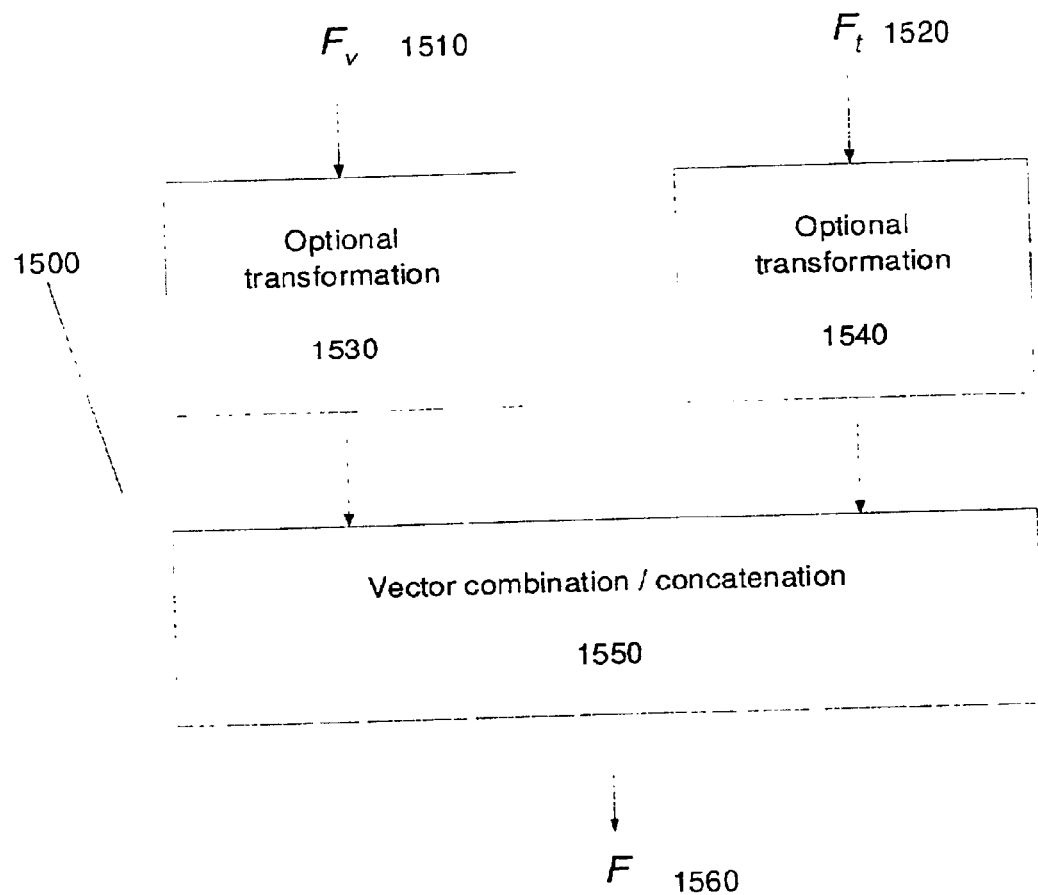
FIG. 15 shows the process of combining visual and textual feature vectors to obtain a vector representing the disparate sources of information in the media item.

FIG. 15 shows a flowchart of the process 1500 of combining the visual feature vector $F_v$ 1510 and the textual feature vector $F_t$ 1520. The output is a combined feature vector F 1560 that represents such disparate sources of information as textual information (e.g., speech transcript) and visual information (i.e., images or sequences of images). These vectors are used in process 400 of FIG. 4 to induce classifiers. The vectors may be labeled or unlabeled and the learning is supervised and unsupervised, respectively. Process 1500 (in FIG. 15) are optionally transformed to assure compatibility in various ways. There is an optional transformation 1530 of the visual feature vector $F_v$ and an optional transformation 1540 of the textual feature vector $F_t$. These transformations can be with respect to range of the feature values appearing in the two kinds of vectors $F_v$ and $F_t$, this is achieved by scaling (normalization) or re-quantization. The transformations may also have to be performed with respect to the competitive lengths of the two kinds of vectors with respect to some norm or measure. In step 1550 the textual feature vector $F_t$ 1520 and the visual feature vector $F_v$ 1510 are combined by concatenation to produce a unified representation in a single vector of disparate kinds of features. Having created the unified representation, the combined feature vector F 1560, of the training data, standard methods of classifier induction are used.

Figure 16:
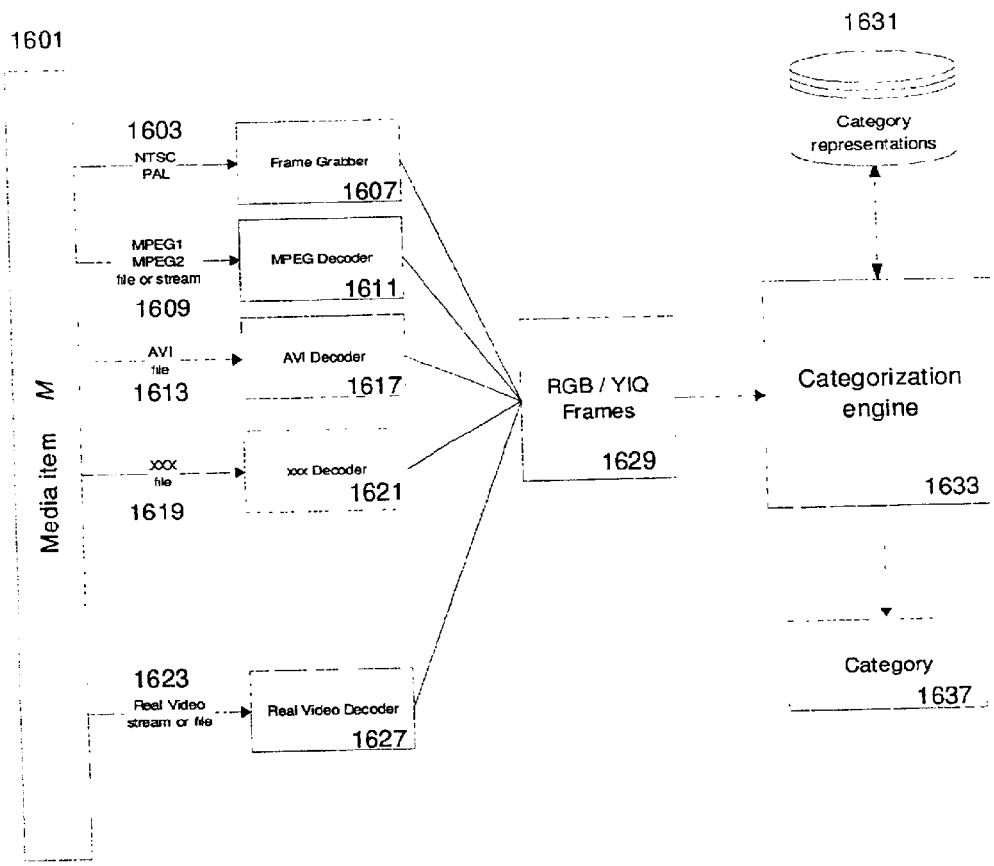
FIG. 16 is a detailed system block diagram of the categorization system, illustrating how different formats of media items are handled in the categorization process.

Turning our attention now to FIG. 16, here is shown a system diagram of the present invention. The media item 1601 could be in any format like NTSC/PAL 1603, MPEG1/MPEG2 file or stream 1609, AVI file or stream 1613, some arbitrary format xxx 1619 or Real Video 1623. Depending on the format of the media, it is processed through the corresponding decoder, NTSC/PAL 1603 through the frame grabber hardware 1607, MPEG1/MPEG2 through the MPEG Decoder 1611, AVI 1613 through the AVI Decoder 1617, some unknown format xxx 1619 through the corresponding decoder 1621, and Real Video 1623 through the Real Video Decoder 1627.

The output of each of the decoders in FIG. 16 will be some generic video frame format like RGB or YIQ 1629 and the data will be in machine readable form. The media item categorization algorithm operates on this 1629 data. The categorization engine 1633, first computed visual and textual vector representations, $F_v$ and $F_t$, respectively from the decoded media item 1629 and uses category representations 1631 to generate the category 1637.

Figure 17:
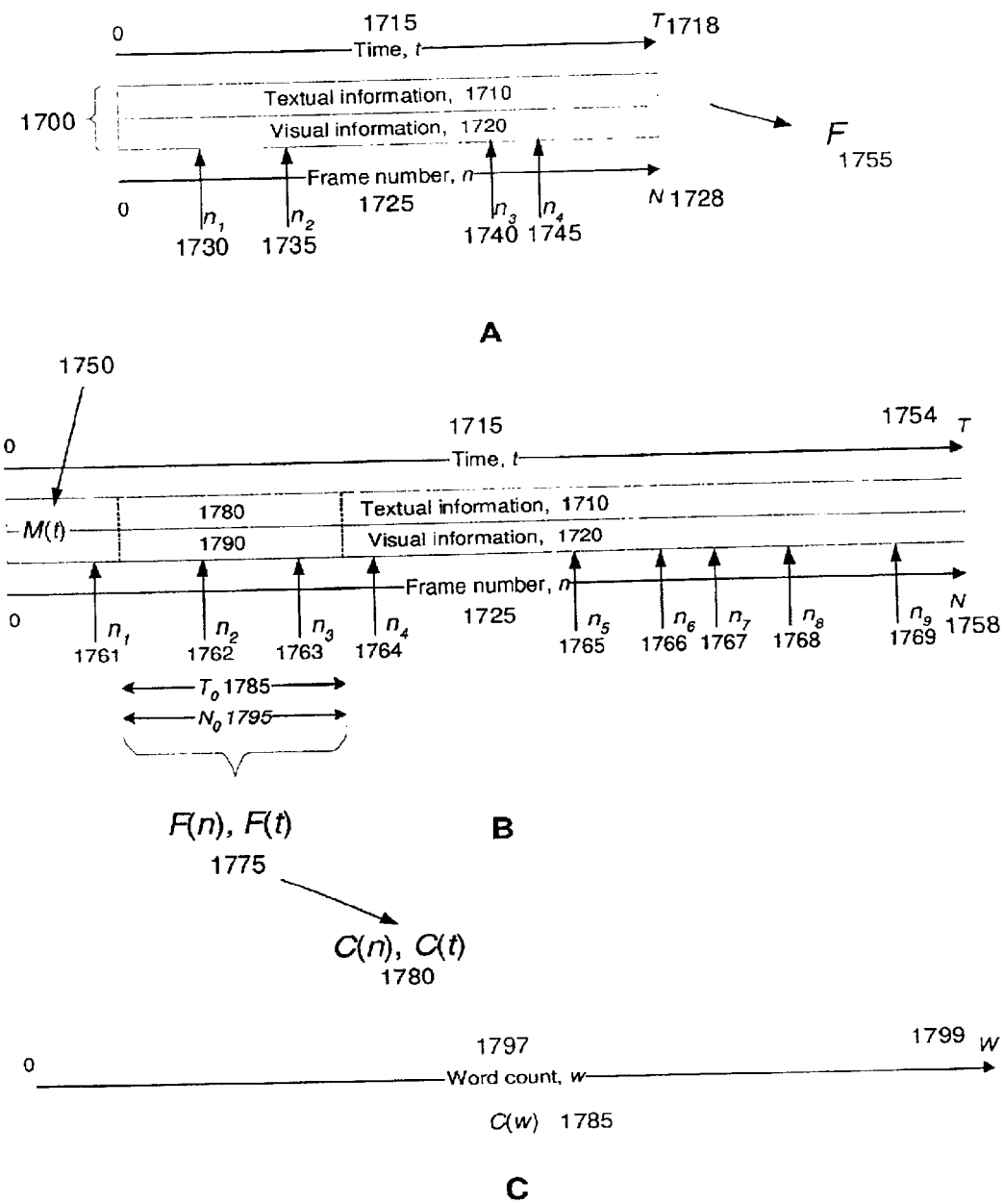
FIG. 17 introduces the idea of associating a feature vector with a continuous portion of the media item as opposed to associating the feature vector with the entire media item.

In FIG. 17 the idea of associating a feature vector F with a blocks of the media item as opposed to associating the feature vector with the entire media item is introduced. The feature vector F is then a function of time of frame number F(t) or F(n), as introduced in FIG. 17B. To emphasize the fact that the media item or stream has time associated with it, we refer to such a media item as M(t) 1750. But first consider FIG. 17A where is show the feature vector F 1755 computation of a media item 1700. Let the media item 1700 be a visual media stream. The stream contains textual information 1710, either in the form of captioning or in the form of an audio track (or both), and visual information 1720 in the form of a sequence of images (frames). An individual frame in the media stream is associated with a frame number n 1725, which corresponds to unique time t 1715 in the stream, given that the stream starts at n=0 and t=0. The media item is of length T 1718 in terms of time and of length N 1728 in terms of frames. If there are 30 frames per second and T is expressed in seconds, then N=30 T. The textual feature vector $F_t$ (refer to FIG. 14) is computed from the textual information 1710. The visual feature vector $F_v$ (refer to FIG. 14) is computed from a subset of the frames, as described in FIGS. 7A and 7B. In the case of FIG. 17A, these are the key frames (or key intervals) $n_1$ (1730), $n_2$ (1735), $n_3$ (1740), and $n_4$ (1745).

FIG. 17B is focussed on generating feature vectors F(t) or F(n) with the ultimate aim of dividing up a media steam 1750 into contiguous segments of one or more categories. In FIG. 17B, a media stream 1750 of length T 1754 seconds and N 1758 frames is shown. As opposed to the media item 1700 in FIG. 17A, where it is assumed that the item is about one subject or category, for media item 1750, the topic, subject or category of the media item may change as a function of time t 1715. Similar to FIG. 17A, key frames (or key intervals) $n_1$ (1761), $n_2$ (1762), $n_3$ (1763), $n_4$ (1764) through $n_9$ (1769) are selected based on some visual criterion. However, in this case, the textual $F_t$ and visual feature vector $F_v$ are determined from an continuous subset of the media stream, subset 1780 of the textual information and subset 1790 of the visual information. This continuous subset of textual and visual information is called a "block." Here the continuous subset is of length $T_0$ 1785 seconds or $N_0$ 1795 frames ($N_0$=30×$T_0$). The textual feature vector $F_t$ is computed from all the textual information in block 1780. The visual feature vector $F_v$, on the other hand, is computed from the key intervals that are contained in block 1790. For the block, the key intervals are $n_2$ (1762) and $n_3$ (1763). A visual feature vector $F_v$ is computed from these key intervals by one of the methods described in FIG. 13. The textual $F_t$ and visual feature vector $F_v$ are then combined into a overall feature vector $F(n_0)$ or $F(t_0)$ 1775 by the process described in FIG. 15. By using such a moving block of both visual and textual information, a category and/or topic C(n) or C(t) 1780 is obtained as a function of time t 1715 or frame number n 1725. It is this function that this invention uses to divide the media item into segments that correspond to different categories.

In FIG. 17C, the media stream 1750 of length T 1754 seconds and N 1758 frames is indexed in a third way, by word count w 1797. Here there are W 1799 words in media item w, 1≦w≦W. Category and or topic can then also expressed a function of word count, w, i.e., C(w) 1785.

Figure 18:
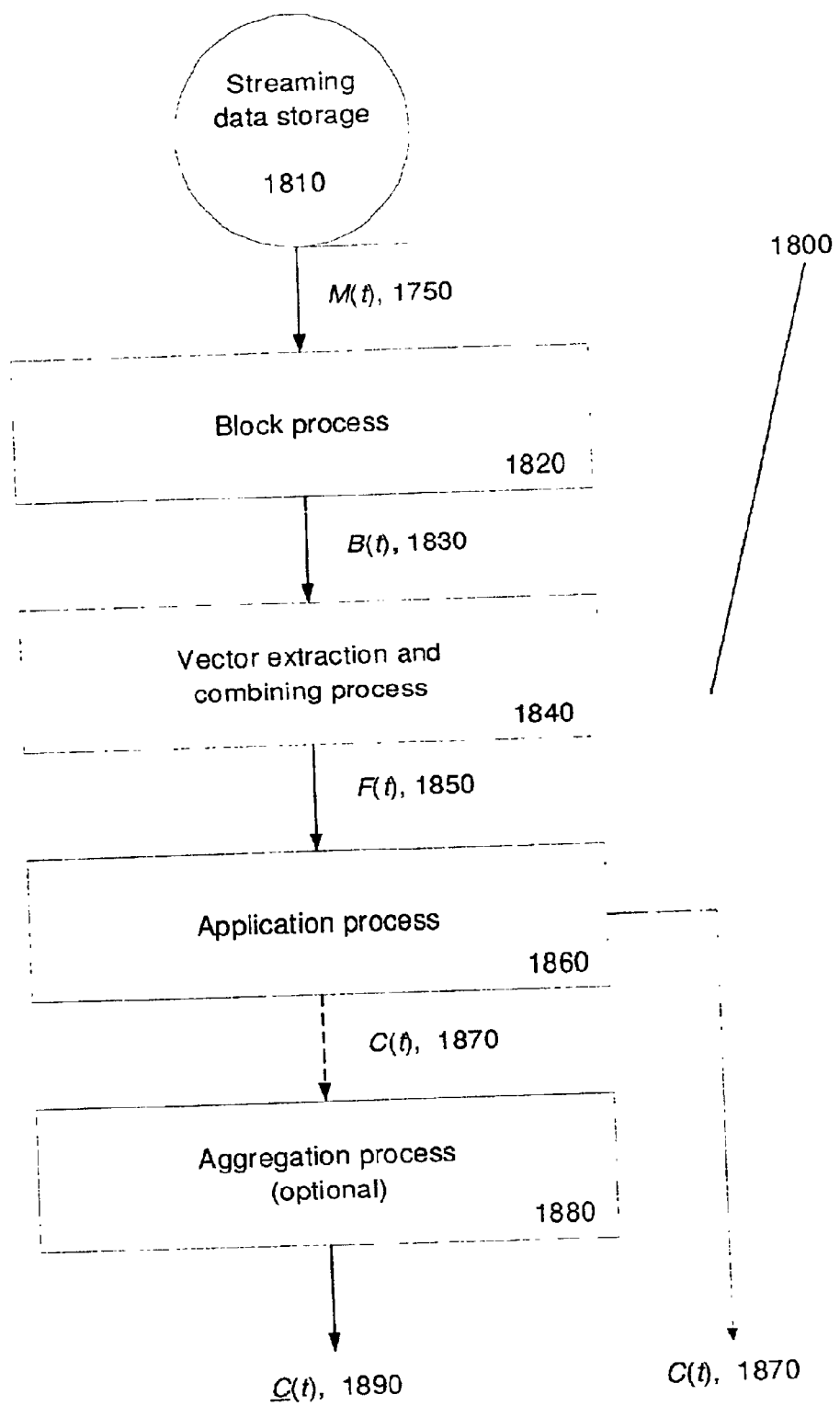
FIG. 18 is a flowchart of a system that uses the media item classifier for segmenting a temporal media item into contiguous segments, where each segment is of one or more categories.

Continuing to FIG. 18, here is shown the process 1800 for dividing up the media item M(t) 1750 into contiguous time segments where each segment is associated with one or more classes and the segments are optionally aggregated into larger more homogeneous segments according to certain rules. Here the rules can be heuristic rules, learned rules from training data, or both. Storage device 1810 contains one or streaming multimedia items M(t) 1750. Output of this device 1810 is the temporal multimedia item 1750, which, importantly, in this figure is not of one single category but can be a concatenation of one or more multimedia segments of different category (subject/topic). Device 1810 streams a multimedia item M(t) 1750, which in block process 1820 is divided up into blocks. This is the process described in FIG. 17. The output 1820 is a block of multimedia data B(t) 1830, which is a function of time t. Each block contains a portion of textual data 1780 (see FIG. 17) plus a portion of visual data 1790 (FIG. 17). The length of these blocks depends on the frequency of change in category in the multimedia item M(t) 1750. Each block B(t) 1830 is in itself a multimedia item. Using the prior art described in FIG. 1, a sparse textual feature vector $F_t(t)$ is extracted, further, using the novel techniques described in FIG. 13, a sparse visual feature vector $F_v(t)$ is extracted in step 1840 from block B(t) 1830. Using the vector combining process described in FIG. 15, these two vectors are combined in process 1840 into vector F(t) 1850, which is the output of process 1840. The application process 1860, uses the classification phase 615 (described in FIG. 6 with the target media stream M 660 equal to B(t) 1830). Output 1870, C(t), of this application process 1860 is a categorization/classification of the media stream M(t) 1750 as a function of time t. At each time t, one or more categories are associated with media stream 1750, denoted as C(t).

There are a number of problems associated with this output 1870 C(t). Even if the classification error for each block is small, say 5%, for example, there is a possible random error in every 20 key frames, key intervals, or blocks of key intervals. These problems are described in the next figure, FIG. 19. An optional aggregation process 1880 develops the output 1870, C(t), into output 1890, $\underline{C}(t)$, according to one or more aggregation rules. These rules can be heuristic and/or can be learned. A heuristic approach is given in FIG. 20. An approach, based on machine learning, is described in FIGS. 21–22.

Figure 19:
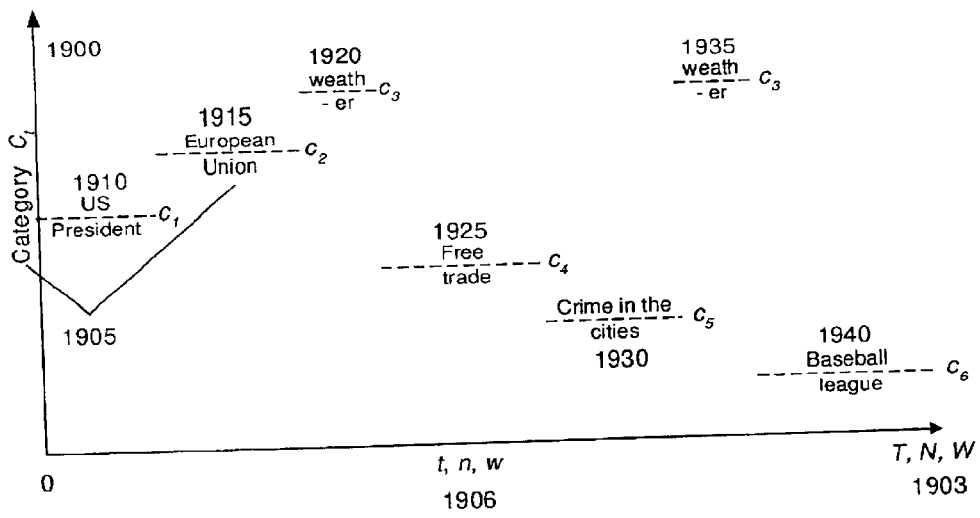
FIG. 19 is a one-dimensional depiction of the categorization as a function of time function that points out problems with temporal media item categorization.
Figure 19:
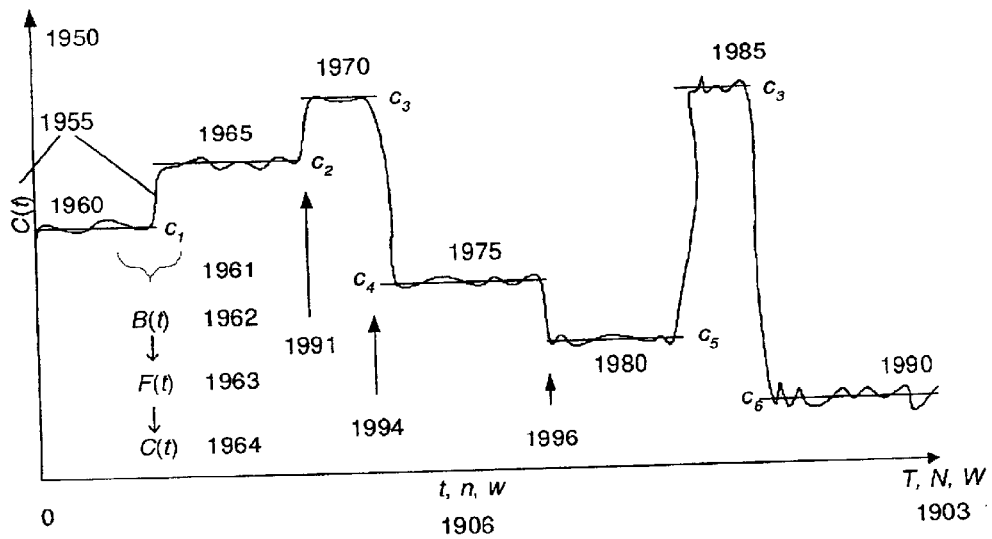
Figure 20:
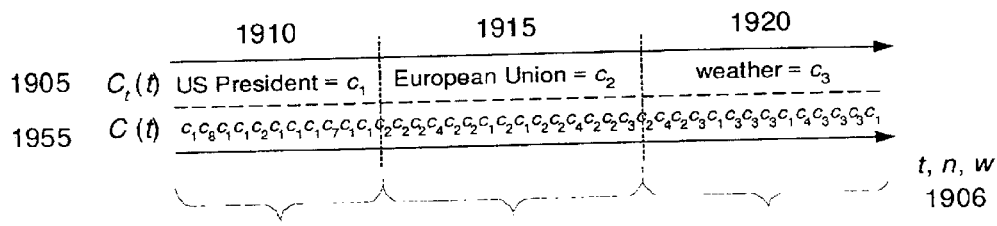
FIG. 20A gives heuristic aggregation rules based on category boundaries.
FIG. 20B gives heuristic aggregation rules based on category regions.
Figure 20:
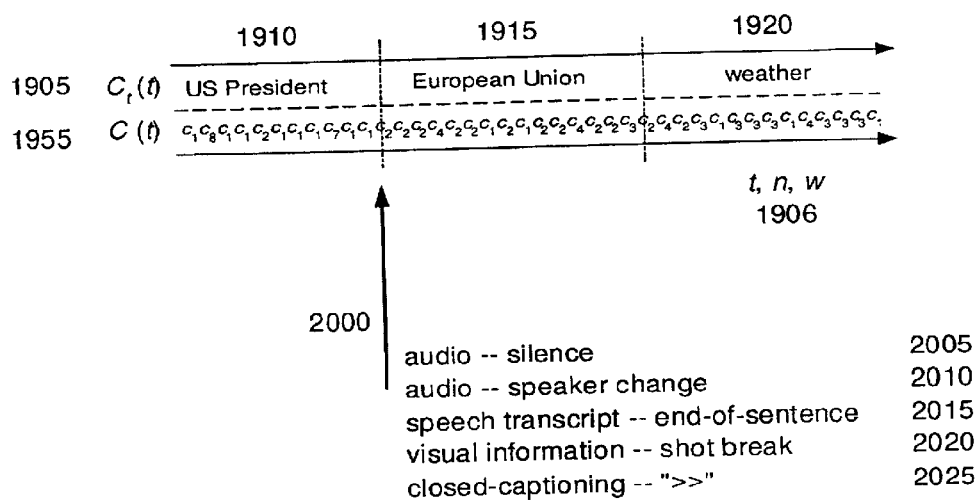

But first, in FIG. 19, the problems with output 1870 C(t) are described. FIG. 19A shows a graph 1900 of the discrete changes in the true category $C_t$ 1905 of a streaming media item M(t) 1750, as a function of time t, frame number n, or word count w 1906. The length of the media item is T seconds, N frames, W words 1903. This media item M(t) is, for example, a portion of a news program. The media item starts with a segment 1910 about "US President," category $c_1$, this is followed by a segment 1915 in the category "European Union," category $c_2$. Segment 1915 is followed by a segment 1920 about the weather 1920 (category $c_3$), which is also the category of the sixth segment 1935. Between the two weather segments 1920 and 1935, there is a segment 1925 about "Free trade," category $c_4$, followed by a segment about "Crime in the cities," category $c_5$. The media item ends with segment 1940 about, "Baseball league," category $c_6$. Hence, the true category $C_t$ 1905 of the media item is a function of time, for example, for interval 1910 $C_t(t)=c_1$, for interval 1915 $C_t(t)=c_2$, for intervals 1920 and 1935 $C_t(t)=c_3$ (the weather), and so on. The function $C_t(t)$ is a discrete function, the function can take on one or more values of a finite number of categories. (A media item does not have to be classified into one distinct class, it may be classified into a multitude of classes.)

FIG. 19B shows a graph 1950 of the estimated categorization function (classifier output) C(t) 1955 (1870 in FIG. 18) as a function of time t 1906 as obtained by application process 1860 in FIG. 18. This function is an illustrative example and not an actual depiction of what the graph would look like. In reality the function is discreet and misclassifications do not necessarily lie close to the true class. The function is also a function of frame number n 1906 and word count w 1906, C(n) and C(w), respectively. Category C(t) 1955 is shown as a one-dimensional function 1955. If the category C(t) could be computed perfectly, this function would be equal to the discrete function $C_t(t)$ of FIG. 19A. However, due to noise and other problems, the function C(t) 1955 is only approximately equal to the true function $C_t(t)$. That is, C(t)≈$c_1$ 1960 in segment 1910, C(t)≈$c_2$ 1965 in segment 1915, C(t)≈$c_3$ 1970 in segment 1920, . . . , C(t)≈$c_6$ 1990 in segment 1940. Here "C(t)≈$c_1$" means that C(t)=$c_1$ at many of the sample points t where C(t) is computed.

A first problem is that the calculated categorization of the blocks within the true segments, 1910, 1915, 1920, . . . , 1940, varies and is subject to outlying categorizations within the true segments from the true category $C_t$ 1905, that is, C(t) not always equals $C_t$. Furthermore, because of the block process (described in FIG. 17), there will always be blocks that span different segments of different categories. This will be the case at the true segment boundaries like 1991, 1994, 1996, where the category changes. Consider, for example, the boundaries between true category segments 1910 and 1915. Here a block of data 1961 is used denoted by B(t) 1962, from this block of data, a feature vector F(t) 1963 is computed. This feature vector is classified into a class C(t) 1964 according to media item categorization described in, e.g., FIG. 16. However, because the block 1961 spans multiple true category segments, the output of the classifier in these type of regions is unreliable.

FIG. 20A shows a temporal display of a portion of the media stream of FIG. 19. This partial media item starts with a segment 1910 of category $c_1$ "US President," this is followed by a segment 1915 of category $c_2$, "European Union." Segment 1915 is followed by a segment 1920 about the weather 1920 (category $c_3$). The true $C_t(t)$ 1905, as a function of time t, frame number n, or word count w 1906 is shown in the upper region. Also shown is the classification of the media item as a function of time C(t) 1955 in the lower region. In reality this classification is a sequence of categories, $c_1 c_8 c_1 \ldots c_2 c_1$, each classification is obtained from a block of multimedia (t) 1962 where the blocks are determined as in FIG. 17 and the category for each block is determined as in described in FIG. 18. Within a media segment of a certain category, there will be random misclassifications. This is shown, for example, as the C(t) 1955 for segment 1910, which is $c_1 c_8 c_1 c_1 c_2 c_1 c_1 c_7 c_1 c_1$. A number of heuristic rules 2050 on how the aggragate the local classifications are shown in FIG. 20A. A first rule is that a media item segment of a certain category should be at least s seconds 2055, where s is dependent on the type of programming. An immediate consequence of this rule is that there are few changes in category over time, that is, C(t) 1955 is a discrete function and each discrete value is taken on for longer time intervals (>s seconds 2055). An aggregation process 1880 (FIG. 18) process groups the local classifications c into larger segments of the same category. Examples of such rules are

| | |
|---|---|
| $c_x c_y c_x \rightarrow c_x c_x c_x$ | 2060 |
| $c_x c_x c_y c_y c_x \rightarrow c_x c_x c_x c_x c_x$ | 2065 |
| $c_x c_y c_y c_x c_x \rightarrow c_x c_x c_x c_x c_x$ | 2070 |
| $c_x c_x c_y c_y c_y c_x c_x \rightarrow c_x c_x c_x c_x c_x c_x c_x$ | 2075 |

Repeated application of these rules changes the local classifications which may initially be fragmented, and will change the local classifications into more contiguous segments of constant category. FIG. 20A concentrates on rules of sequences of block classifications, or block classifications within segments of a single category. That is, these are region-based rules.

FIG. 20B, on the other hand, concentrates on rules for finding the boundaries between segments of different categories. Classification C(t) 1955 of the blocks around the boundaries are unreliable because these classifications are based on blocks B(t) 1830 that span multiple categories of the underlying media M(t) 1750. A number of cues 2000 from the multimedia can be used to more accurately find category boundaries. The exact location of the categories boundaries can be pinpointed by using the various modalities that are present in a media item. The cues in these various modalities are audio silences 2005, speaker changes 2010, end-of-sentence indications in the speech transcript 2015, a shot break in the visual track 2020, and the presence of ">>" in the closed-captioning (">>" is intended to indicate change of subject) 2025.

Given the combined feature vectors F(t), i.e., the vector representing the visual information $F_v(t)$ combined with the vector representing the textual information $F_t(t)$, each block can be classified into a category. One way to achieve this is to use a classifier to categorize every block independently using the combined feature vector of the block. A series of heuristic rules such as described in FIGS. 20A and 20B can then be used to aggregate the categorization and more accurately determine the category boundaries.

Another way to achieve this is to build a model for predicting the categories of the blocks, consisting of states, based on states of other blocks. Each block can be associated with one state. The categorizer then predicts a cost of each state associated with every block based on the combined feature vector. The optimal sequence of states is selected by minimizing the cost. The category can be equal to the state or the category can be a function of the state. This approach is described in FIGS. 21 and 22.

Consider the simplified flowchart of FIG. 21A that takes media stream M(t) 2105 as input, or, equivalently, that takes a stream of visual and textual feature vectors F(t) 2110 as input. Here is shown system 2100, a categorization process (also called, application process) 1860 followed by aggregation process 1880, exactly as in FIG. 18. Assume we only have two categories, i.e., "sport" and "disaster" denoted by $C_1$ and $C_2$, respectively. The features $F_i = F(t_i)$ 2110 for each block can be one of three values: $F_s$ sport scene, $F_t$ talking head, and $F_d$ disaster scene. The input 2110 to the system is a sequence of feature vector $F_i = F(t_i)$ 2110, which takes on values $F_s$, $F_t$ and $F_d$ derived from (a block of the) media stream M(t) 2105.

In a simple model, we let the state for each block be the category associated with the block, i.e., the category or state can only be "sport" or "disaster." The classifier then is $C(F_s) = C_1$, $C(F_d) = C_2$, $C(F_t) = C_1$ or $C_2$. The output of the application process 1840 is $C_i = C(t_i) = S(t_i)$ 2115. The idea then is to transform the sequence of ambiguous categories or states $C_i = C(t_i) = S(t_i)$ into a sequence of unambiguous states $\underline{S}(t_i)$ 2120 (or, equivalently, a sequence of categories $\underline{C}_i = \underline{C}(t_i)$), which is of minimal cost, as computed in 1860. That is, input media stream 2105 is categorized into a smoothly labeled (categorized) stream 2120.

To achieve this, in the process 2150 of FIG. 21B, using training data 2130 and an optional set of manual rules 2135, a set of multi modality state transition costs L ($C_i$, $C_j$); i=1, 2, j=1, 2 (2140) is determined.

A possibility for the process of determining state transition costs in process 2150 and the aggregation process 1880 is, e.g., a Markov model. In a Markov probability model, the probability of a sequence of states $s_1, \ldots, s_T$ (each state takes on the value "sport"=$C_1$ or "disaster"=$C_2$) is decomposed as $$p(s_1, \ldots, s_T) = p(s_1)p(s_2|s_1) \ldots p(s_T|s_{T-1}).$$

To estimate the conditional probability $p(C_2|C_1)$ (where $C_1$ or $C_2$ indicates "sport" or "disaster" and, e.g., $p(C_2|C_1) = L(C_1, C_2)$ in 2140), we count the number occurrences # ($C_1$, $C_2$) of the sequence segments $s_{i-1}$, $s_i$ in the training set 2130 such that $s_{i-1} = C_1$ and $s_i = C_2$. The conditional probability can then be estimated as $$p(C_2|C_1) = \#(C_1, C_2)/\#\{(C_1, C); C = \text{sport, disaster}\}.$$

That is, in system 2150 of FIG. 20B, $p(C_2|C_1)$ is the number of times that category $C_1$ is followed by category $C_2$ divided by the number of times that category $C_1$ is followed by any category. In one model, the cost function L ($C_1$, $C_2$) 2140 an be selected to be $-\log p(C_2|C_1)$. Hence, when the probability of the transition of one state to another is low, the corresponding cost is high.

In aggregation process 1880 (of FIGS. 18 and 21A) the most likely sequence of states $s_1, \ldots, s_T$ is computed. The more likely a sequence of states $s_1, \ldots, s_T$ is, the less the total cost $$\text{Total cost} = L(s_2, s_1) + L(s_3, s_2) + \ldots + L(s_T, s_{T-1})$$
$$= L(C_2, C_1) + L(C_3, C_2) + \ldots + L(C_T, C_{T-1}).$$

This cost is minimized in 1880 over all possible sequences of states $s_1, \ldots, s_T$, or, equivalently, over all possible sequences of categories $C_1, \ldots, C_T$, resulting in $\underline{C}_i = \underline{C}(t_i) = \underline{S}(t_i)$ 2120

Figure 22:
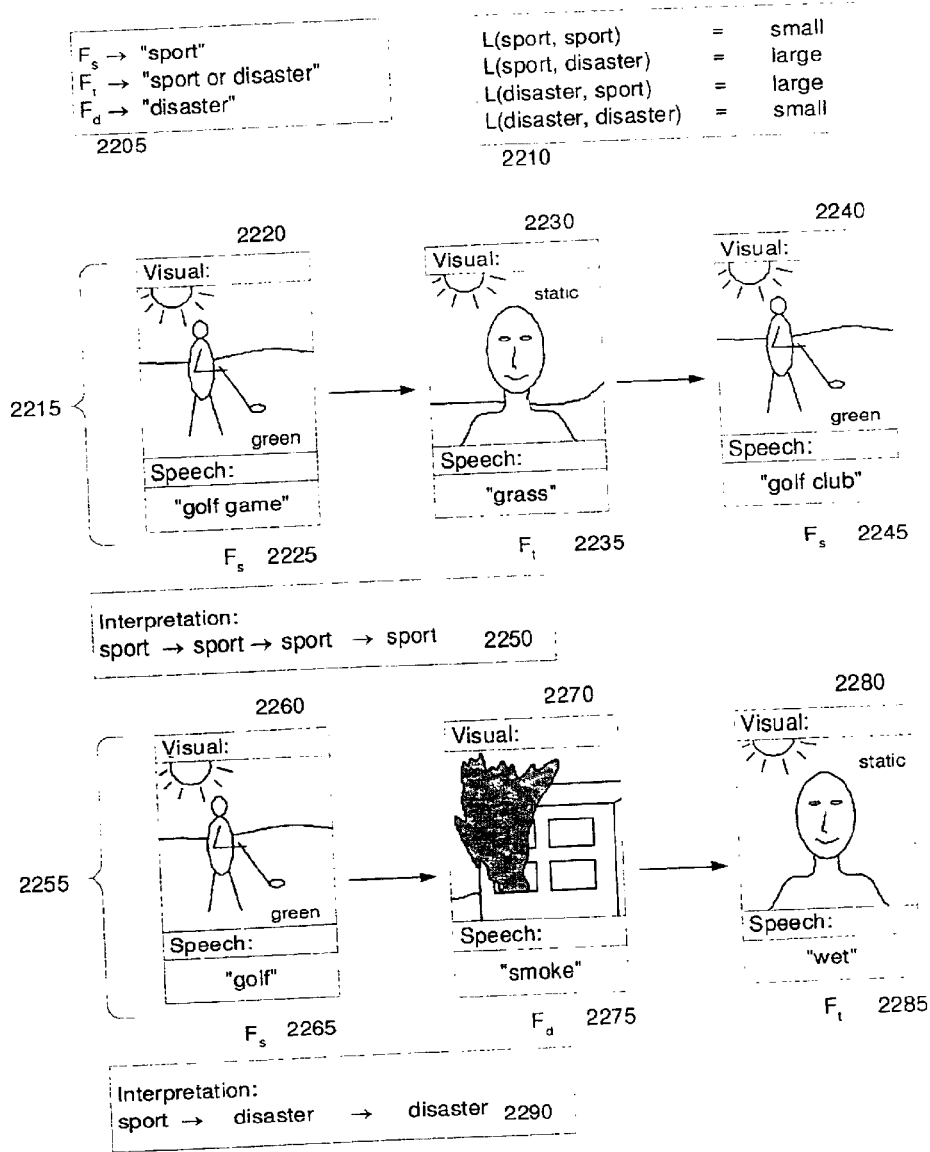
FIG. 22 shows two examples of a lowest-cost interpretation rules and the application of the rules to a short sequence of categories.

For some example rules and costs now see FIG. 22. Assume that the block based classifier output indicates that

| | | |
|---|---|---|
| $F_s$ | → | sport |
| $F_t$ | → | sport or disaster |
| $F_d$ | → | disaster | where $F_s$, $F_t$, and $F_d$ are combined textual and visual feature vectors as shown in 2205. Further assume that from the Markov state model 2150 described in FIG. 21B, it is observed that 2210:

| | | |
|---|---|---|
| L(sport, sport) | is | small |
| L(sport, disaster) | is | large |
| L(disaster, sport) | is | large |
| L(disaster, disaster) | is | small |

Imagine we have the sequence 2215. Based upon the visual and auditory information, frame 2220 has feature vector $F_s$ (2225), frame 2230 has feature vector $F_t$ (2235), and frame 2240 has feature vector $F_s$ (2245). That is we have the following the following sequence of feature vectors $$F_s \rightarrow F_t \rightarrow F_s$$

Without state modeling, there are two interpretations from the classifier using 2205:

| | | | | | | |
|---|---|---|---|---|---|---|
| sport | → | sport | → | sport | → | sport |
| sport | → | disaster | → | sport | → | sport |

The first interpretation is more likely 2250 by using our state model 2210.

For the second sequence 2255, we have frame 2260 has feature vector $F_s$ (2265), frame 2270 has feature vector $F_t$ (2275), and frame 2280 has feature vector $F_s$ (2285). And we have the sequence of feature vectors $$F_s \rightarrow F_d \rightarrow F_t$$

Again, there are two interpretations using the classifier (without state modeling, using 2205):

| | | | | |
|---|---|---|---|---|
| sport | → | disaster | → | sport |
| sport | → | disaster | → | disaster |

Figure 21:
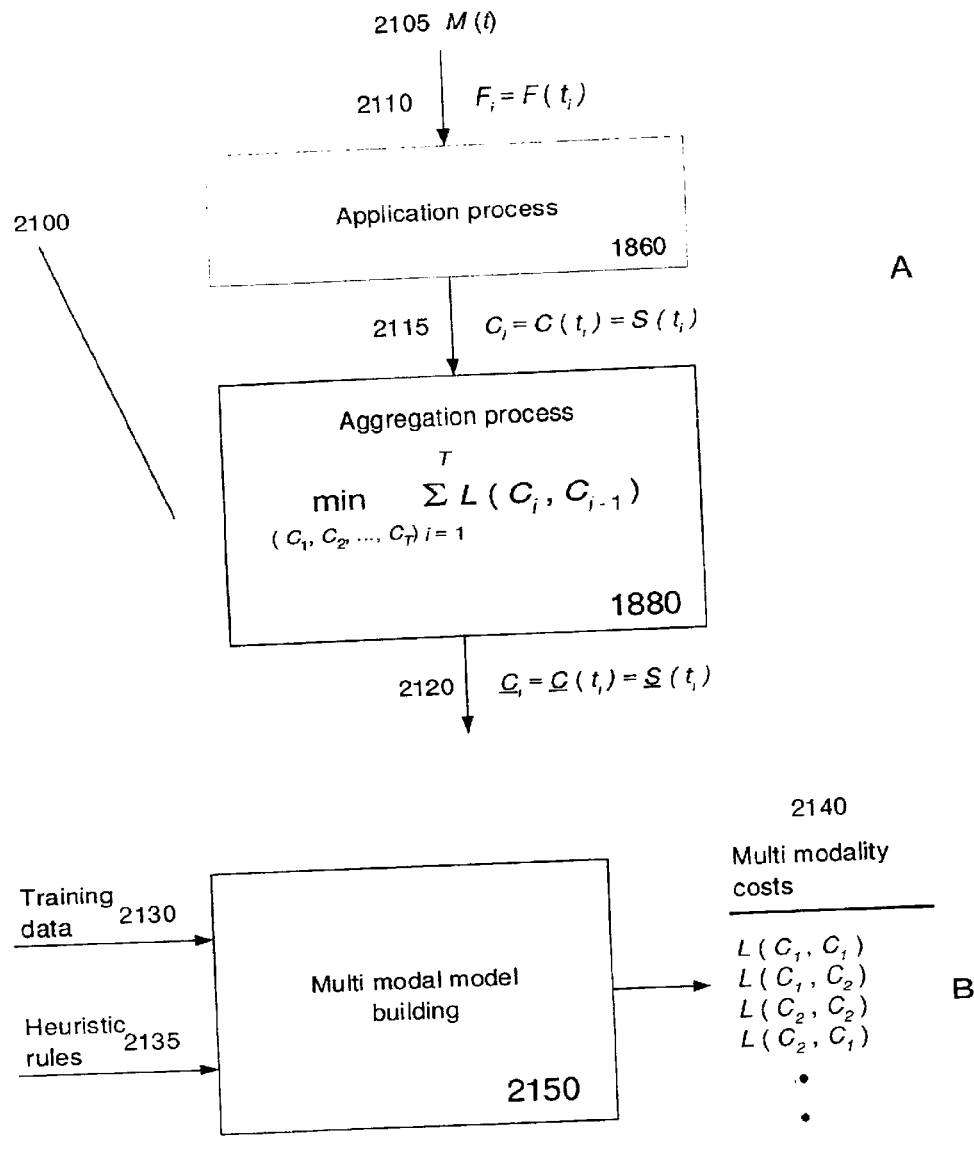
FIG. 21A is an instance of the flowchart of FIG. 18 where the optimal category aggregation is determined by optimizing a cost function.
FIG. 21B is a system for learning aggregation rules based on labeled training data and optional heuristic rules.

Consequently, using 2210, the second interpretation 2290 is the more likely one. FIGS. 21 and 22 are just an example of the use of state transition learning for smoothing the categorization of video over time and thereby arriving and a better segmentation. Other methods are obvious to those skilled in the art.

Uses of the Invention

We list a number of applications that are hard or impossible to achieve with prior art technology.

A First Number of Uses Are:

1. Categorizing media elements into a number of categories. For example, let the media element be a news item and let us predefine categories like, sports, weather, politics. The addition of visual features, beyond textual features, in the feature vector that represents the media elements allows for more precise (in the sense of a lower error rate) categorization of the media element.
2. Automatically determining a number of natural categories that a set of media elements can be partitioned into. That is, discovering a set of categories that describes the set of media element compactly. Here the addition of visual features, beyond textual features, in the feature vector that represent the media elements allows for more refined partitioning of the media elements.
3. Given that a media element has been classified into a category that is either predefined as in 1) or automatically learned as in 2) the current invention allows to more precisely assign a topic to the classified media element. Say that a media element has been classified as a sports video segment, the addition of visual features allows for better, (i.e., more accurately) assigning a topic (basketball, soccer, golf, etc.) to the given media element.
4. The combination of textual features and visual features into one feature vector that represents the media element enables better detection or identification of a media element in a certain category with a certain topic, in a collection of media elements. Here, better detection means lower false positive and lower false negative rates.
5. The combination of textual features and visual features into one feature vector that represents the media element enables better detection or identification of a particular media element, in a collection of media elements. Here, better detection means lower false positive and lower false negative rates.
6. The automatic generation of MPEG-7 descriptors, as defined by the International Organisation for Standardisation/Organisation Internationale de Normalisation, ISO/IEC JTC1/SC29/WG11 specification "Coding of Moving Pictures and Audio." These descriptors are metadata items (digitally encoded annotations) which would be embedded in the bitstreams of videos (television; movies), sometime between the time of content creation ("filming" or "capture") and the time of broadcast/release. These metadata items are then available to all downstream processes (post-production/editing stages of preparation of the complete video product, distribution channels for movie releases, or by receivers/viewers of the broadcast), for various purposes, in particular, retrieval from video archives by content-based querying (in other words, facilitating the finding of video clips of interest, or a specific video clip, from within large collections of video). The descriptors can be used to explicitly label events of interest in a video when they happen, such as the scoring of goals in soccer matches. Manually-controlled processes for creation of such annotations are available now, but the work is tedious and expensive.

The business process patent covers the use of the invention in each of the following specific business applications.

The Invention Has Many Direct Applications:

A first application is locating (illegal) copies of media items on the Internet or other (public) databases. This application involves searching for digital copies of media elements on the Internet or other (public) databases. With the wide spread use of digital media (audio and video), the illegal copying and distribution of media are becoming a significant problem for the media industry. For example, there are a number of web sites that post illegal copies of video on the Internet. The media is encoded in one of the popular formats (AVI, MPEG1 or MPEG2 for video). Typically, the filenames under which the media is posted, are not indicative of the content of the media files. To identify a posted media item as a known media item, a comparison of the media content of the file (video and audio) is necessary.

The classification method described in this invention can be used to perform this comparison. In this case, the media items of interest (say several movies) are used as the reference media items to generate a representation in terms of textual/visual feature vectors. The classification engine is now deployed with these vectors. The target media items are transferred from web sites at the Internet to the computing system that houses the classification engine described in this invention. That is, the media element needs to be downloaded to the machine on which the classification engine is running. The downloading operation can be achieved in multiple ways, an operator could feed URL's to down loader software, which would download the files to the local machine or alternatively, a web crawler robot could be designed to locate URL's that hold media files. This can be done by looking at the filename extensions (.mpeg, etc). The URL's located by the crawler robot or human operator can be filtered based on various criteria, like size of the media items, to generate a list of URL's for downloaded software.

Once a target media item has been downloaded to the local machine, the classification engine is deployed to generate an report about similarities to the media items of interest.

This application provides functionality similar to video water marking in that the search engine detects the intrinsic properties (features) of the media item instead of the embedded water marks.

The present invention can be employed in the management of large video databases. Such collections of video clips (media items) need to be managed and searched in several environments like TV news, documentary, movie and sitcom productions. In these production environments, media items in the database will be used to produce program material, often the same media item in different productions. It is important to keep track of the usage of a media item from the perspective of rights management and royalty payments. The media item classification technologies discussed in this invention can be used in this process.

Every media item (s) which is entered into the database is first used as target media item and searched against a data structure of feature vectors that represent the reference media items in the database. This operation generates an index report of similar media items in the database. The media item to be entered into the database is stored along with similar media items, items of the same category.

The feature vector the data structure is stored along with the database and used retrieve content.

As per the above procedure, the data structure of feature vectors will continually grow as more and more media items are added to the database. Several tasks, like removing redundant copies of the media items, selecting all media items in certain categories and with certain topics, etc., are straightforwardly accomplished This invention can be used to segment a video stream into a series of time-continuous media items. Given that a large number of (categories, topic) pairs are defined, a target video stream can be categorized, with a topic associated, as a function of t, time, or n, frame number. This is achieved by determining a combined textual/visual feature vector as a function of time or frame number. A certain window of text and visual information is used to compute the feature vector. Typically, this window is continuous time for audio data and, thus, continuous time for textual data. The window is discrete time for visual information, with the finest time resolution each frame. The window can be causal, i.e., [t, t+T] and [n, n+N], or non-causal, i.e., [t−T/2, t+T/2] and [n−N, n+M]. Here, (t, n), (t+T, n+N), (t−T/2, n−N), (t+T/2, n+M) are corresponding (time, frame number) pairs. The sequences of frames n−N, . . . , n and n−N, . . . , n+M, do not have to be subsequent frames or evenly spaced frames. The frames, n, n−N, n+M can be selected to be key frames, or frames with other special characteristics, e.g., maximal/minimal apparent motion or optical flow.

Classifying the media stream within the window, with the means described in the current invention, results in a discrete function C(t), i.e., the function can take on a potentially very large number of discrete values. This function will be roughly constant when the category, topic does not change and change to another constant value when the category, topic changes at some time t. This change will, in general, be gradual within the interval of the window.

Segmenting the media stream into time-continuous media items with distinct category, topic is now an issue of detecting changes in the value of C(t), as described in this patent application. There are a multitude of applications of this invention when the target media stream is segmented into separate media item. An application, for instance, is monitoring a given television for the occurrence of instances of a pre-specified set of media items. Such broadcast monitoring can be used to detect any type of pre-produced media material. The more typical use is for verifying the broadcasting of TV commercial messages (advertisements). Advertisers (companies whose products are being advertised) require an independent verification of the actual broadcasting of the commercial in order to make payments to the broadcaster. This process currently relies on a human viewer sampling the channel to verify the airing of a commercial. Hence, it is a labor intensive and error prone process.

The media element similarity measurement process described in this invention that combines textual and visual features can be used to serve the function of the human viewer. The commercial messages to be monitored is a set reference media items S. As described in this invention, these reference media element are used to generate a feature vector. To monitor a given channel, Channel X, (a target media stream) for commercials, a computing system that houses the classifier described in this invention is used. Depending on the type of broadcast (National Television System Committee (NTSC), Phase Alternating Line (PAL), digital, analog/digital audio), the media element (tuned to Channel X), visual, speech and captioning, is decoded and input to the computing system.

The media element classifier operates on the target media stream and produces a report. This report, in the case of commercial monitoring, will include the title of the commercial detected (reference media item identifier), the date and approximate time at which the commercial started, the date and approximate time at which the commercial ended and some type of classification quality, e.g., some similarity measure between reference media item and a segment of the target media stream, hence, a similarity measure between the combined feature vector of the target media segment and the combined feature vector of the reference media item.

An application of the present invention targeted towards the task of video indexing is video event detection. Video indexing can be defined as the operation of designating video items (media items) with certain predefined labels. There exists a significant body of prior art on the subject of video indexing. For example, consider a video of a soccer game, indexing this video will result in annotation table that looks as follows:

| Event Number | ~ Begin Time | ~ End Time | Label |
|---|---|---|---|
| 1 | 00:00:10:12 | 00:00:12:10 | Penalty Kick |
| 2 | 00:20:12:10 | 00:20:13:10 | Field Goal |
| 3 | 00:33:12:09 | 00:35:12:10 | Penalty Corner |
| 4 | . . . | . . . | . . . |

There are several approaches to generating such reports, using software algorithms, described in the prior art. One of the approaches to event detection has been disclosed in R. Mohan. This approach uses reference video segments (examples of how a typical event would look like) and compares the target stream to the reference video segment based on generating codes for both the reference segment and the target segment. The discussion provided by Mohan however does not address the problem of performing such similarity measurements between a target stream and a multiplicity (large number) of reference streams, nor does it address including the textual information. Essentially, the target stream is simultaneously compared to the reference segments in a sequential fashion, one reference segment at a time, only using visual information. This inherently limits the number of reference segments that can be used in the comparisons.

The classification methods discussed in this invention can be applied to the video event detection problem as follows. The multiple example videos (media items) for the events to be detected are selected. These videos form the reference media streams S. The reference media streams are used to compute reference feature vectors.

The search engine described in this invention is deployed using these reference feature vectors. The target media stream (the video to be annotated) is fed to the appropriate decoder and the classification engine operates on the target media stream to generate the report. This report is a tabulation of the events in the target stream as shown in the table above.

This event detection is not limited to off-line video annotation, but also can be performed in real-time. Applications are in the arena of monitoring and human machine interaction. Events, such as, dangerous situations, human gestures combined with spoken command, etc. Can be detected in real time by employing the classification engine described in this invention with an appropriate feature vectors.

Another use of this invention is the categorization of multimedia email. Today, the content of email consists of text, possibly with attachments, or it consists of an html—hypertext markup language—file, which is itself text, possibly with references to other files or data objects that may provide non-textual data to be used by a browser when the html file is displayed. In the future, we envision email whose content is primarily a video message, possibly embedded in or accompanying a text file (e.g., an html file) used to control the display of the video message.

Such video email may well be created in a scenario such as the following, in which we assume the computer belonging to the user—here being Sam Sender—is equipped with speakers, a video camera trained on the user, and voice recognition software. Sam Sender wishes to send a message to Richard Receiver, a customer service representative at the Message Receiver Corp. Assuming that Sam Sender has named his computer Sybil, Sam says or signals, "Sybil, send a message to Richard Receiver at MessageReceiverCorp.com, with caption: 'Complaint about billing error.'" The computer identifies the email address of the recipient, detects that the intended text caption for the message is "Complaint about billing error," prepares to store the video and sound components of the message in a file, turns on the camera, and then says to Sam "Ready to record message." The Sam recites his message using colorful language, while gesticulating and making faces. All of this is recorded by the computer. Sam finishes by saying or signaling "Sybil, send message." The computer would then create a file containing the caption to be displayed, the video (including sound) that was recorded, the address of the sender, and any other information needed to enable the ultimate display of the captioned video by Richard Receiver's computer.

The classifiers induced by the method of this invention, if trained with appropriate training data, could be used to classify such video email.

For instance, in the scenario above, the mail server at the Message Receiver Corp. might apply a classifier to categorize the message as one that should be handled by Bill Bungler in the billing department, consequently sending a copy of the message directly to Bill Bungler in order to expedite resolution of the problem, while also sending a note to Richard Receiver informing him of this.

We claim:

1. A computer system having one or more memories and one or more central processing units (CPUs), the system comprising:
   one or more multimedia items, stored in the memories, each multimedia item having two or more disparate modalities, the disparate modalities being at least one or more visual modalities and one or more textual modalities; and
   a combining process that creates a visual feature vector for each of the visual modalities and a textual feature vector for each of the textual modalities, and concatenates for each of the one or more multimedia items the visual feature vectors and the textual feature vectors into a unified feature vector.

2. A system, as in claim 1, further comprising a classifier induction process that induces a classifier from the unified feature vectors.

3. A system, as in claim 2, where the classifiers include any one or more of the following: a hyperplane classifier, a rule-based classifier, a Bayesian classifier, maximum likelihood classifier.

4. A system, as in claim 1, further comprises:
   one or more classifiers having one or more classes; and
   an application process that for each of the multimedia items, uses the classifiers to predict zero or more of the classes to which the respective multimedia items belong, the multimedia items being unprocessed multimedia items, and where in the case that zero categories are predicted the multimedia item does not belong to any class.

5. A system, as in claim 1, further comprising a transformation process that transforms one or more feature vectors in the set of visual feature vectors and textual feature vectors in order to make one or of more the visual feature vectors compatible with one or more of the textual feature vectors for the all the multimedia items.

6. A system, as in claim 5, where the visual feature vectors and textual feature vectors are made compatible by limiting the component values in the respective visual and textual feature vectors.

7. A system, as in claim 6, where the component values include: a binary value; a one bit binary value; a 0, 1, 2 or many value; a value in a range; a discrete value; and a 0, 1, 2, or 3 value.

8. A system, as in claim 5, where the visual feature vectors and textual feature vectors are made compatible by limiting a difference between magnitudes of the visual and textual feature vectors.

9. A system, as in claim 8, where the difference in magnitudes is limited by normalizing the visual and textual feature vectors.

10. A system, as in claim 5, where the visual feature vectors and textual feature vectors are made compatible by limiting the difference between the number of components in the respective vectors.

11. A system, as in claim 1, where the visual feature vectors comprise one or more of the following: a set of ordered components, a set of unordered components, a set of only temporally ordered components, a set of only spatially ordered components, a set of temporally and spatially ordered components, a set of visual features extracted from ordered key intervals, a set of visual features extracted from ordered key intervals divided into regions, and a set of semantic features.

12. A system, as in claim 1, where the visual feature vectors have a fixed length, the fixed length being independent of length of the multimedia items.

13. A system, as in claim 1, where the visual feature vectors comprise one or more components that are selected so that the visual feature vectors are sparse.

14. A system, as in claim 1, where the visual feature vectors represent any one or more of the following: a color, a motion, a visual texture, an optical flow, a semantic meaning, semantic meanings derived from one or more video streams, an edge density, a hue, an amplitude, a frequency, and a brightness.

15. A system, as in claim 1, where the textual feature vectors are derived from any one or more of the following: close captions, open captions, captions, speech recognition applied to one or more audio inputs, semantic meanings derived from one or more audio streams, and global text information associated with a multimedia item.

16. A computer system having one or more memories and one or more central processing units (CPUs), the system comprising:
   one or more multimedia items, stored in the memories, each multimedia item having two or more disparate modalities, the disparate modalities being at least one or more visual modalities and one or more textual modalities;
   a block process that divides the multimedia items into blocks of one or more key intervals, each key interval having one more frames of the multimedia items;

a combining process that creates a visual feature vector for each of the visual modalities and a textual feature vector for each of the textual modalities, and concatenates for each of the blocks the visual feature vectors and the textual feature vectors into a unified feature vector;

one or more classifiers having one or more classes;

an application process that for each of the blocks, uses the classifiers to determine zero or more of the classes to which the respective blocks belong; and a segmentation process that finds temporally contiguous groups of the blocks and combines the contiguous groups into media segments where all the blocks in the media segment have one or more of the same classes.

17. A system, as in claim 16, further comprising an aggregation process that aggregates two or more of the media segments belonging to the same class with one or more media segments of a different class according to one or more aggregation rules.

18. A system, as in claim 17, where the aggregation rules include any one or more of the following rule types: segment region rules, segment boundary indicator rules, and learned rules that are derived from training data.

19. A system, as in claim 18, where the segment region rule has a minimum segment length constraint and a plurality of rules that change small sequences of blocks of varying categorization into blocks of equal category.

20. A system, as in claim 18, where the segment boundary indicator rules are multimedia cues and these multimedia cues are one or more of the following: a shot transition, an audio silence, a speaker change, an end-of-sentence in speech transcript, and a topic change indicator in the closed-caption.

21. A system, as in claim 18, where the learned rules are the costs of transitions and the aggregations process aggregates two or more of the media segments belonging to the same class with one or more media segments of a different class by minimizing the overall cost of the sequence of segments.

22. A method for segmenting multimedia streams comprising the steps of:

storing one or more multimedia items in one or more memories of computer, each multimedia item having two or more disparate modalities, the disparate modalities being at least one or more visual modalities and one or more textual modalities;

dividing the multimedia items into blocks of one or more key intervals, each key interval having one more frames of the multimedia items;

for each block, creating a visual feature vector for each of the visual modalities and a textual feature vector for each of the textual modalities;

for each block, concatenating the visual feature vectors and the textual feature vectors into a unified feature vector;

categorizing each of the blocks by categorizing the respective unified feature vector; and assembling two or more of the categorized blocks into a segment.

23. A memory storing a program, the program comprising the steps of:

storing one or more multimedia items in one or more memories of computer, each multimedia item having two or more disparate modalities, the disparate modalities being at least one or more visual modalities and one or more textual modalities;

dividing the multimedia items into blocks of one or more key intervals, each key interval having one more frames of the multimedia items;

for each block, creating a visual feature vector for each of the visual modalities and a textual feature vector for each of the textual modalities;

for each block, concatenating the visual feature vectors and the textual feature vectors into a unified feature vector;

categorizing each of the blocks by categorizing the respective unified feature vector; and assembling two or more of the categorized blocks into a segment.

24. A system for segmenting multimedia streams comprising:

means for storing one or more multimedia items in one or more memories of computer, each multimedia item having two or more disparate modalities, the disparate modalities being at least one or more visual modalities and one or more textual modalities;

means for dividing the multimedia items into blocks of one or more key intervals, each key interval having one more frames of the multimedia items;

means for creating a visual feature vector for each of the visual modalities and a textual feature vector for each of the textual modalities, block by block;

means for concatenating the visual feature vectors and the textual feature vectors into a unified feature vector, block by block;

means for categorizing each of the blocks by categorizing the respective unified feature vector; and means for assembling two or more of the categorized blocks into a segment.

* * * * *